US008540435B2

(12) United States Patent
Norris et al.

(10) Patent No.: US 8,540,435 B2
(45) Date of Patent: Sep. 24, 2013

(54) FERRULE RETAINERS HAVING ACCESS WINDOW(S) FOR ACCESSING AND/OR REFERENCING A FIBER OPTIC FERRULE, AND RELATED FIBER OPTIC CONNECTOR ASSEMBLIES, CONNECTORS, AND REFERENCING METHODS

(75) Inventors: Martin Eugene Norris, Lenoir, NC (US); Thomas Theuerkorn, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 137 days.

(21) Appl. No.: 13/188,538

(22) Filed: Jul. 22, 2011

(65) Prior Publication Data
US 2013/0022317 A1    Jan. 24, 2013

(51) Int. Cl.
G02B 6/36    (2006.01)
(52) U.S. Cl.
USPC .................................. 385/78; 385/53; 385/97
(58) Field of Classification Search
USPC ................. 385/52, 53, 56, 60, 70, 72, 76, 62, 385/81, 77, 78, 97, 136, 137; 29/428
See application file for complete search history.

(56) References Cited

U.S. PATENT DOCUMENTS

| 4,140,366 | A | 2/1979 | Makuch et al. ............ 350/96.22 |
| 4,140,367 | A | 2/1979 | Makuch et al. ............ 350/96.22 |
| 4,142,776 | A | 3/1979 | Cherin et al. ............. 385/96.21 |
| 4,174,882 | A | 11/1979 | McCartney ................ 350/96.21 |
| 4,225,214 | A | 9/1980 | Hodge et al. .............. 350/96.21 |
| 4,279,467 | A | 7/1981 | Borsuk et al. ............. 350/96.21 |
| 4,678,264 | A | 7/1987 | Bowen et al. ................ 350/96.2 |
| 4,725,120 | A | 2/1988 | Parzygnat .................. 350/96.22 |
| 4,793,683 | A | 12/1988 | Cannon, Jr. et al. ....... 350/96.21 |
| 4,820,185 | A | 4/1989 | Moulin ........................ 439/321 |
| 5,042,901 | A | 8/1991 | Merriken et al. ............. 385/135 |
| 5,104,242 | A | 4/1992 | Ishikawa ........................ 385/53 |
| 5,109,452 | A | 4/1992 | Selvin et al. .................... 385/69 |
| 5,214,830 | A | 6/1993 | Rozycki ......................... 29/240 |
| 5,242,315 | A | 9/1993 | O'Dea .......................... 439/577 |
| 5,267,342 | A | 11/1993 | Takahashi et al. ............. 385/140 |
| 5,276,750 | A | 1/1994 | Manning ........................ 385/56 |
| 5,283,848 | A | 2/1994 | Abendschein et al. ......... 385/59 |
| 5,473,715 | A | 12/1995 | Schofield et al. ............... 385/53 |
| 5,590,229 | A | 12/1996 | Goldman et al. ............... 385/59 |
| 5,715,342 | A | 2/1998 | Nodfelt et al. .................. 385/61 |

(Continued)

OTHER PUBLICATIONS

Patent Cooperation Treaty, International Search Report, Nov. 8, 2012, 9 pages.

*Primary Examiner* — Charlie Peng
*Assistant Examiner* — Mary El Shammaa

(57) ABSTRACT

Ferrule retainers for retaining and supporting fiber optic ferrules in an optical fiber connector are disclosed. In one embodiment, the ferrule retainers include one or more access windows for accessing an alignment feature(s) of the ferrule located inside the ferrule retainer when the ferrule is assembled in the ferrule retainer. In this manner, the alignment feature(s) of the ferrule is accessible for referencing, if desired, when processing (e.g., polishing) the optical fiber(s) disposed in the ferrule when the ferrule is assembled in the ferrule retainer. The access window(s) provided in the ferrule retainers allows fiber processing equipment to reference the alignment feature(s) of the ferrule when assembled in a ferrule retainer regardless of whether the fiber processing equipment also references the ferrule retainer to reference the ferrule. The embodiments disclosed herein also include related fiber optic connector assemblies, connectors, and referencing methods.

36 Claims, 18 Drawing Sheets

(56) References Cited

U.S. PATENT DOCUMENTS

| | | | |
|---|---|---|---|
| 5,745,622 A | 4/1998 | Birnbaum | 385/75 |
| 5,778,122 A | 7/1998 | Giebel et al. | 385/55 |
| 5,892,870 A | 4/1999 | Fingler et al. | 385/59 |
| 5,896,480 A | 4/1999 | Scharf et al. | 385/88 |
| 5,920,669 A | 7/1999 | Knecht et al. | 385/76 |
| 5,940,559 A | 8/1999 | Noll | 385/53 |
| 6,069,992 A | 5/2000 | Hyzin | 385/55 |
| 6,206,579 B1 | 3/2001 | Selfridge et al. | 385/60 |
| 6,234,683 B1 | 5/2001 | Waldron et al. | 385/78 |
| 6,264,374 B1 | 7/2001 | Selfridge et al. | 385/78 |
| 6,305,849 B1 | 10/2001 | Roehrs et al. | 385/59 |
| 6,331,079 B1 * | 12/2001 | Grois et al. | 385/53 |
| 6,357,929 B1 | 3/2002 | Roehrs et al. | 385/59 |
| 6,361,218 B1 * | 3/2002 | Matasek et al. | 385/60 |
| 6,371,660 B1 | 4/2002 | Roehrs et al. | 385/59 |
| 6,464,408 B1 * | 10/2002 | Nolan | 385/87 |
| 6,478,625 B2 | 11/2002 | Tolmie et al. | 439/608 |
| 6,554,487 B2 * | 4/2003 | Nolan | 385/78 |
| 6,579,014 B2 | 6/2003 | Melton et al. | 385/76 |
| 6,588,938 B1 | 7/2003 | Lampert et al. | 385/58 |
| 6,648,520 B2 | 11/2003 | McDonald et al. | 385/78 |
| 6,685,361 B1 | 2/2004 | Rubino et al. | 385/58 |
| 6,752,657 B2 | 6/2004 | Gehrke et al. | 439/577 |
| 6,899,467 B2 | 5/2005 | McDonald et al. | 385/78 |
| 6,960,025 B2 | 11/2005 | Gurreri | 385/58 |
| 7,090,406 B2 | 8/2006 | Melton et al. | 385/62 |
| 7,090,407 B2 | 8/2006 | Melton et al. | 385/62 |
| 7,111,990 B2 | 9/2006 | Melton et al. | 385/53 |
| 7,113,679 B2 | 9/2006 | Melton et al. | 385/113 |
| 7,137,742 B2 | 11/2006 | Theuerkorn et al. | 385/53 |
| 7,244,066 B2 | 7/2007 | Theuerkorn | 385/53 |
| 7,264,402 B2 | 9/2007 | Theuerkorn et al. | 385/59 |
| 7,654,747 B2 | 2/2010 | Theuerkorn et al. | 385/59 |
| 7,785,019 B2 | 8/2010 | Lewallen et al. | 385/75 |
| 2004/0017983 A1 | 1/2004 | Chen et al. | 385/78 |
| 2004/0028342 A1 | 2/2004 | Jones et al. | 385/56 |
| 2005/0041928 A1 | 2/2005 | Zimmel et al. | 385/55 |
| 2005/0117850 A1 | 6/2005 | Milette | 385/55 |
| 2006/0045428 A1 | 3/2006 | Theuerkorn et al. | 385/53 |
| 2006/0204178 A1 | 9/2006 | Theuerkorn et al. | 385/59 |
| 2007/0098328 A1 | 5/2007 | Dean et al. | 385/71 |
| 2013/0022317 A1 * | 1/2013 | Norris et al. | 385/78 |

* cited by examiner

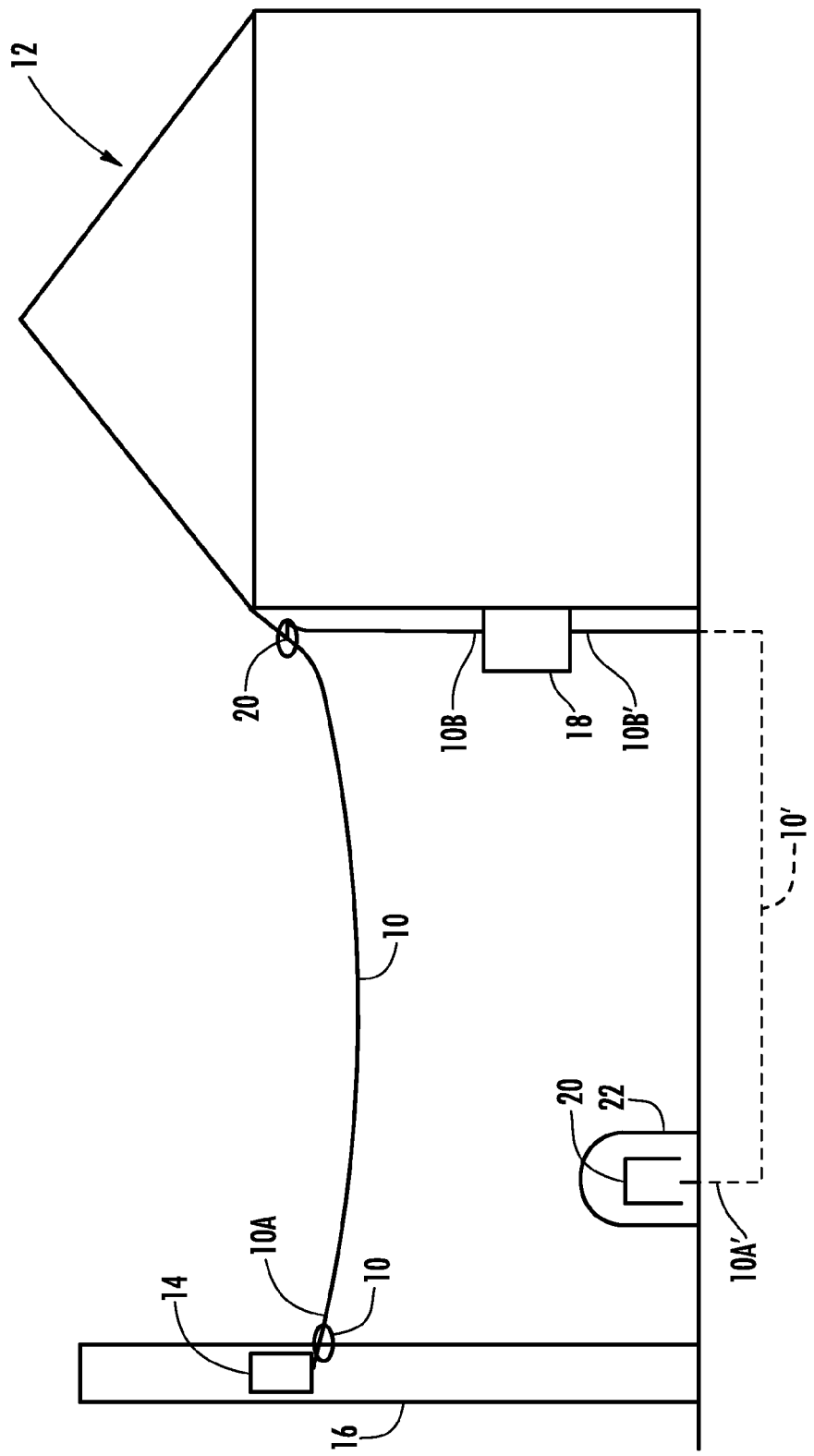

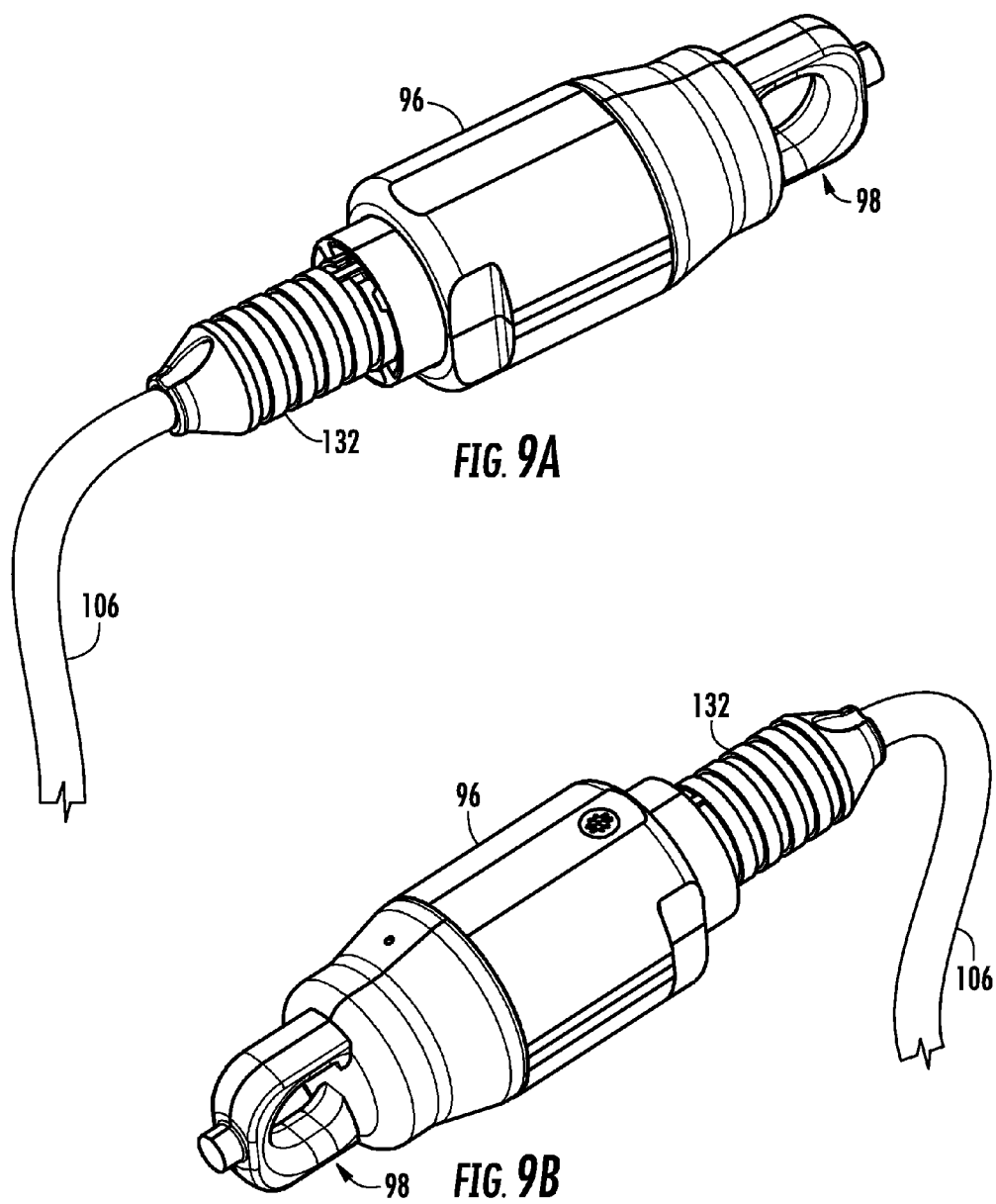

FERRULE RETAINERS HAVING ACCESS WINDOW(S) FOR ACCESSING AND/OR REFERENCING A FIBER OPTIC FERRULE, AND RELATED FIBER OPTIC CONNECTOR ASSEMBLIES, CONNECTORS, AND REFERENCING METHODS

BACKGROUND

1. Field of the Disclosure

The disclosure relates to preassembled ferruled connector assemblies and connectors, including multi-fiber connector assemblies and connectors, and particularly to mechanical referencing of ferrules configured for preassembled connector assemblies during optical fiber polishing and measurement and methods therefor.

2. Technical Background

Optical fibers are used for a variety of applications including voice communications, data transmission and the like. In this regard, FIG. 1 schematically illustrates two preconnectorized fiber optic cables 10 and 10' being routed to a premises 12 of a subscriber using two different exemplary installation techniques. Specifically, FIG. 1 shows a first preconnectorized fiber optic cable 10 being routed to the premises 12 in an aerial installation and a second preconnectorized fiber optic cable 10' being routed to the premises 12 in a buried installation. In the aerial installation, a first end 10A of the preconnectorized cable 10 is attached at a first interface device 14 located at, or near, a pole 16. A second end 10B of the preconnectorized cable 10 is attached at a second interface device 18 located at the premises 12. By way of example, the first interface device 14 may be a closure, multiport (a device having multiple receptacles), or the like, and the second interface device 18 may be a closure, network interface device (NID), optical network terminal (ONT), or the like. In a buried installation, a first end 10A' of the preconnectorized cable 10' is attached at a first interface device 20, which is typically disposed in a housing 22. A second end 10B' of the preconnectorized cable 10' is attached at the second interface device 18 located at the premises 12.

In order to interconnect a plurality of optical fibers with a minimum amount of attenuation, a pair of multi-fiber connectors is preferably mated such that the opposing optical fibers are biased into contact with one another. To achieve optimal transmission without utilizing refractive index matching gel, the multi-fiber connectors must be precisely aligned in order to correspondingly align the individual optical fibers in the connectors. This alignment is typically provided by guide pins that extend outwardly from the end face of a male multi-fiber ferrule for insertion into corresponding guide pin openings, grooves or other structures defined by a female multi-fiber ferrule. In addition for precise alignment, the geometry of the ferrule and, in particular, the polish geometry of the end face of the ferrule, is extremely important to insure proper fiber-to-fiber contact.

In this regard, at least the portion of the end face of each ferrule that is proximate to the optical fibers is preferably polished to define a plane extending perpendicular (or angled to) to the longitudinal axis defined by the guide pin openings and, therefore, perpendicular to the fiber bores. In addition, the planar surface defined by the portion of the end face of each ferrule proximate to the fiber bores is precisely positioned relative to the ends of the optical fibers. For example, with proper polish geometry, the optical fibers will extend by a predetermined distance beyond the end face of the ferrule so that fiber-to-fiber contact between opposing optical fibers is established. If, however, the polish geometry is not precisely defined, fiber-to-fiber contact may be prevented or otherwise obstructed by contact between those portions of the end faces of the opposing ferrules that extend beyond the ends of the optical fibers.

In order to monitor the polish geometry and the resulting quality of each ferrule, it is desirable to determine the planarity of the end face of the ferrule and the angle of the end face relative to the guide pin openings. As such, FIGS. 2A and 2B illustrate a ferrule 30 in which an end face reference surface 32, also referred to herein as the "region of interest," is measured for planarity. The end face reference surface 32 is an area on the end face 34 of the ferrule 30 in the vicinity of a plurality of fiber bores 36. Truncated measurement pins 38A, 38B having very precisely machined ends that extend from the end face 34 of the ferrule 30 can be used to determine if the end face reference surface 32 of the ferrule 30 has been properly molded or machined to be planar. In order to determine the planarity of the end face reference surface 32, the measurement pins 38A, 38B are inserted into guide pin openings 40A, 40B, respectively, to define measurement pin reference surfaces 42A, 42B.

Referring to FIG. 2B, the measurement pins 38A, 38B are machined to be very flat on one of their reference surfaces 42A, 42B. The plane defined by the measurement pin reference surfaces 42A, 42B of one or both of the measurement pins 38A, 38B can then compared to the end face reference surface 32 using an interference vision system, such as an interferometer having three dimension (3D) capabilities. After comparative measurements have been made and the planarity of the end face reference surface 32 confirmed, the measurement pins 38A, 38B are removed from the guide pin openings 40A, 40B and replaced with conventional guide pins to produce a male ferrule. A female ferrule is produced with vacant guide pin openings 40A, 40B operable for receiving the guide pins of a respective male ferrule. Predetermined lengths of optical cable may then be produced by combining sections of cable comprising mating male and female ferrules.

There are several disadvantages associated with using truncated measurement pins 38A, 38B to measure the planarity of the end face reference feature 32 and/or the angularity of the end face 34. For one, the measurement pins 38A, 38B are expensive to manufacture because of the very precise machining of one of their ends. Furthermore, the measurement pins 38A, 38B may be easily lost due to their extremely small size. Also, when using the ends of the measurement pins 38A, 38B as a reference surface, it is necessary to make the optical measurements using a relatively expensive interference vision system having 3D capabilities. Still further, with conventional multi-fiber ferrules, male multi-fiber ferrules cannot be measured for planarity after assembly due to the difficulty in removing the guide pins without possibly damaging the ferrule assembly. Consequently, there is an unresolved need in the art for a simpler, faster, and less expensive way to make planarity measurements.

SUMMARY OF THE DETAILED DESCRIPTION

Embodiments disclosed in the detailed description include ferrule retainers for retaining and supporting fiber optic ferrules (also referred to as "ferrule") in an optical fiber connector. The ferrule retainers disclosed herein may be configured to support either single-fiber or multi-fiber ferrules. In one embodiment, the ferrule retainers include one or more access windows for accessing an alignment feature(s) of the ferrule located inside the ferrule retainer when the ferrule is assembled in the ferrule retainer. In this manner, the alignment feature(s) of the ferrule is accessible for referencing, if desired, when processing (e.g., polishing) the optical fiber(s) disposed in the ferrule when the ferrule is assembled in the ferrule retainer. The access window(s) provided in the ferrule retainers allows fiber processing equipment to reference the alignment feature(s) of the ferrule when assembled in a ferrule retainer regardless of whether the fiber processing equipment also references the ferrule retainer to reference the ferrule. The embodiments disclosed herein also include related fiber optic connector assemblies, connectors, and referencing methods.

In one embodiment, a ferrule retainer configured to receive and support a fiber optic ferrule for an optical fiber connector assembly is provided. This ferrule retainer comprises a retainer body. This ferrule retainer also comprises an interior chamber disposed within the retainer body, the interior chamber disposed along a longitudinal axis of the retainer body. The ferrule retainer also comprises an opening disposed through a portion of a first end of the retainer body, the opening in communication with the interior chamber and configured to allow an end face of a ferrule, disposed along the longitudinal axis of the retainer body, to be disposed through the opening. At least one access window is disposed through a second portion of the first end of the ferrule body to allow access to at least one alignment feature of the ferrule retained in the interior chamber of the retainer body when the end face of the ferrule is disposed through the opening.

In another embodiment, an optical fiber connector assembly is provided. This optical fiber connector assembly comprises a ferrule having a ferrule body comprising a first end and a second end, an end face disposed on the first end, and at least one alignment feature disposed between the first end and the second end of the ferrule body. This optical fiber connector assembly also comprises a ferrule retainer. The ferrule retainer comprises a retainer body, and an opening disposed through a portion of a first end of the retainer body and configured to allow an end face of a ferrule, disposed along the longitudinal axis of the retainer body, to be disposed through the opening. At least one access window is disposed through a second portion of the first end of the retainer body to allow access to at least one alignment feature of the ferrule retained within the ferrule retainer and accessible through the at least one access window.

In another embodiment, a method of referencing a ferrule in an optical fiber connector assembly is provided. This method includes providing a referencing platform having at least one reference feature. This method also includes receiving the at least one reference feature in at least one access window disposed in a second portion of a first end of a ferrule retainer, the ferrule retainer retaining a ferrule comprising an end face disposed through an opening disposed in a first portion of the first end of the ferrule retainer. This method also includes abutting an end surface of the at least one reference feature to at least one alignment feature of the ferrule retained within the ferrule retainer.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 1 schematically illustrates a drop link portion of an optical network being routed to a premises using different installation techniques;

FIGS. 9A and 9B are left and right perspective assembled views, respectively, of the MTP ferruled fiber optic plug sub-assembly in FIGS. 6A-6C;

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include ferrule retainers for retaining and supporting fiber optic ferrules (also referred to as "ferrules") in an optical fiber connector. The ferrule retainers disclosed herein may be configured to support either single-fiber or multi-fiber ferrules. In one embodiment, the ferrule retainers include one or more access windows for accessing an alignment feature(s) of the ferrule located inside the ferrule retainer when the ferrule is assembled in the ferrule retainer. In this manner, the alignment feature(s) of the ferrule is accessible for referencing, if desired, when processing (e.g., polishing) the optical fiber(s) disposed in the ferrule when the ferrule is assembled in the ferrule retainer. The access window(s) provided in the ferrule retainers allows fiber processing equipment to reference the alignment feature(s) of the ferrule when assembled in a ferrule retainer regardless of whether the fiber processing equipment also references the ferrule retainer to reference the ferrule. The embodiments disclosed herein also include related connector assemblies, connectors, and referencing methods.

Figure 2A:
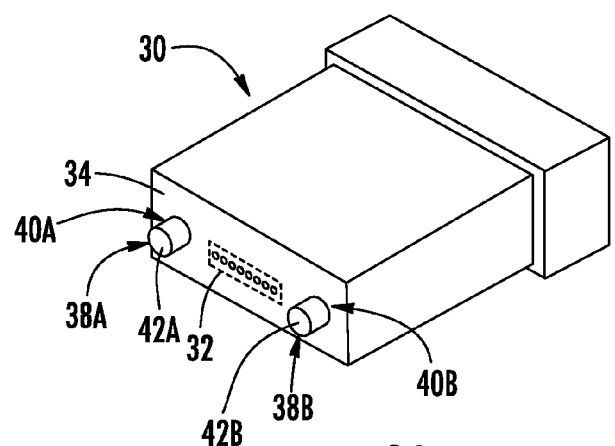
FIGS. 2A and 2B are perspective and enlarged end face views, respectively, of an exemplary multi-fiber termination push-on (MTP) fiber optic ferrule in which truncated precision measurement pins are used for determining the planarity of a region of interest on the end face of the ferrule and/or the angularity of the end face relative to a reference plane.
Figure 2B:
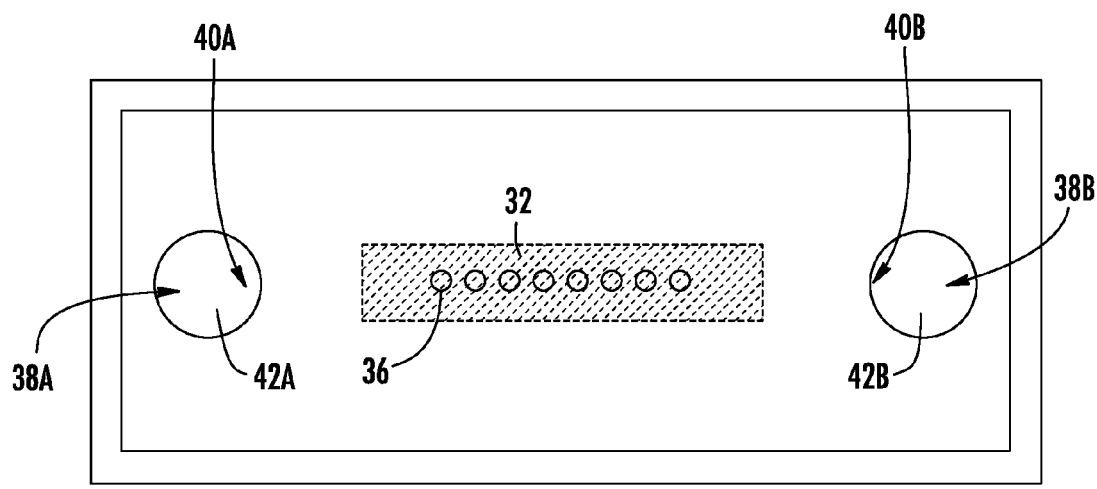
Figure 3A:
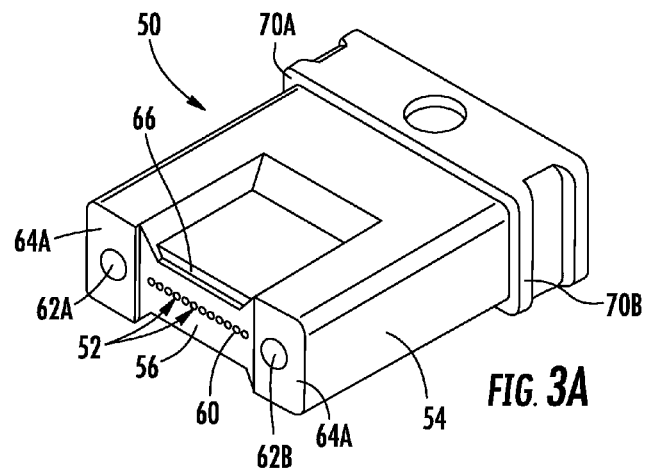
FIGS. 3A-3D are perspective, top plan, enlarged top plan, and rear views, respectively, of a molded MTP ferrule for an MTP ferruled connector assembly.
Figure 3B:
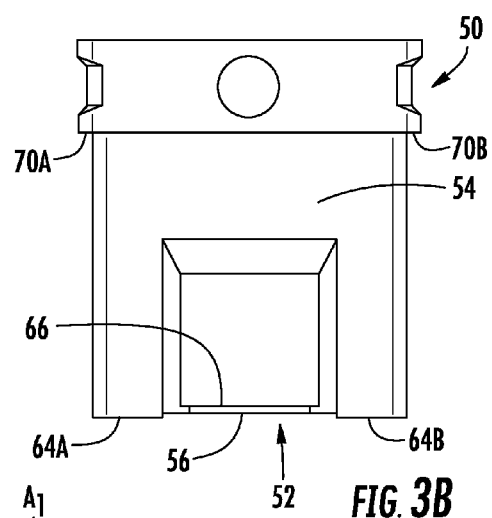
Figure 3C:
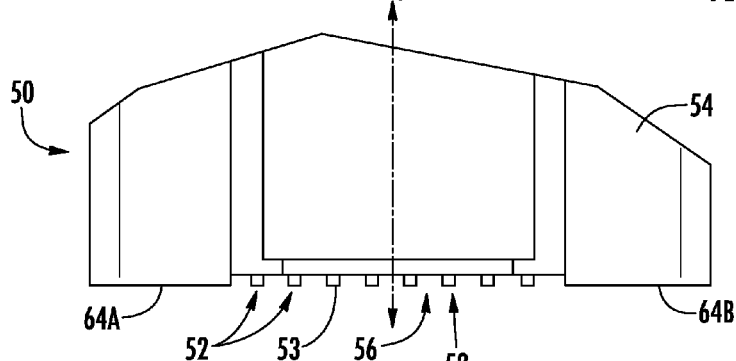
Figure 3D:
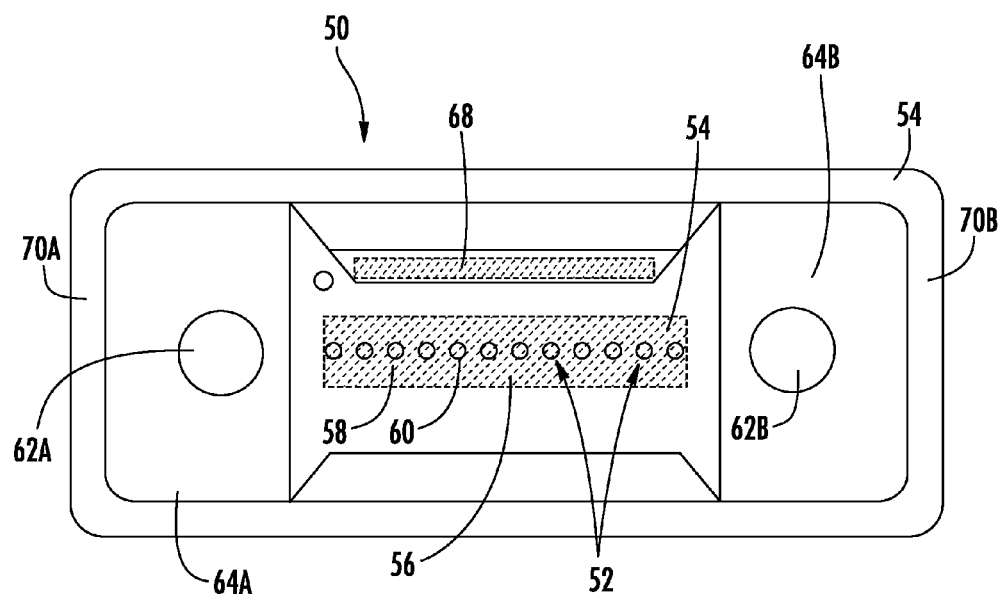

FIGS. 3A-3D illustrate one embodiment of a molded fiber optic ferrule 50 (also referred to as "ferrule 50"). The ferrule 50 is a multi-fiber ferrule in this embodiment. The ferrule 50 is mounted upon end portions 52 of optical fibers 53, as illustrated in FIG. 3C. The ferrule 50 includes a ferrule body 54 having a generally rectangular-shaped end face 56 about the connective end of the ferrule 50. Referring to FIG. 3D, while the end face 56 of the ferrule 50 comprises a end surface reference surface 58 on the end face 56 in the vicinity of fiber bores 60, the remainder of the ferrule 50 may have any desired shape and, as such, may have the shape of any conventional ferrule including, but not limited to, a multi-fiber ferrule, such as an MTP, MT-RJ, MPO or SC/DC ferrule, or a single fiber ferrule, such as an SC, ST, or LC ferrule.

As illustrated in FIGS. 3A and 3D, the ferrule body 54 defines at least one fiber bore 60 extending along a longitudinal axis $A_1$ of the ferrule body 54 and adapted to receive an optical fiber 53 therein. While the ferrule 50 may be a single fiber ferrule that defines only a single fiber bore 60, ferrules shown throughout and described herein are multi-fiber ferrules and define a plurality of fiber bores 60 adapted to receive a plurality of optical fibers 53 therein. In addition, while the multi-fiber ferrules are shown having only a single row of fiber bores 60, the molded ferrule may comprise any number of fiber bores 60 arranged in any predetermined manner including, but not limited to, multiple rows of fiber bores 60 (e.g., a multiple row, multi-fiber array). Typically, multi-fiber ferrules also define at least one and, more commonly, a pair of guide pin openings 62A, 62B adapted to receive respective alignment members, such as guide pins (not shown).

As shown in FIG. 3A, the plurality of fiber bores 60 generally open through a medial portion of the end face 56 of the ferrule body 54, while the guide pin openings 62A, 62B generally open through a lateral portion of the end face 56 of the ferrule body 54. At least one and preferably a pair of polishing bumpers 64A, 64B extend outwardly in a forward direction relative to the end face 56. Referring to FIG. 3C, the plurality of optical fibers 53 may extend a predetermined amount beyond the surface of the end face 56. In all embodiments, the amount of protrusion of the optical fibers 53 from the end face 56 may be in the range from about 0 to about 15 micrometers (μm), more preferably from about 3.0 μm to about 15.0 μm. As illustrated in FIGS. 3A and 3B, a molded-in reference feature 66 is located adjacent to, and recessed from, the end face 56. The reference feature 66 comprises a predetermined shape and defines a reference surface 68, as shown in FIG. 3D.

To ensure proper contact between optical fibers 53, and thus good optical transmission at the end face 56, the end face 56 should be polished (or otherwise finished) generally perpendicular to the fiber bores 60. Because the guide pin openings 62A, 62B are generally parallel to the fiber bores 60, the guide pin openings 62A, 62B and guide pins disposed therein can be used to align mating ferrules, and particularly the opposing optical fibers of mating ferrules. In one embodiment, with respect to the reference plane, the guide pin openings 62A, 62B are perpendicular to within 0.003 millimeters (mm) over the length of the guide pin openings 62A, 62B. For example, given about a 2.0 mm guide bore opening 62A, 62B, there is about a 0.021 mdeg allowable angle between the reference plane and each guide pin opening 62A, 62B. The bumpers 64A, 64B may provide a polishing plane for one manufacture step in obtaining co-planarity of the optical fibers 53. As such, the height of the bumpers 64A, 64B after polishing may be used as a reference to determine the height of the optical fibers 53. The bumpers 64A, 64B are eventually ground down to a predetermined depth, for example, the bumpers 64A, 64B may be entirely removed down to the end face 56 or they may protrude as desired. As stated above, the surface of the end face 56 is not machined subsequent to the molding process. In various embodiments, the reference surface 68 is not altered subsequent to the molding process, even when the bumpers 64A, 64B are entirely removed.

In various embodiments, the optical fibers 53 may be polished substantially normal (i.e., perpendicular) to the longitudinal axis $A_1$ of the ferrule body 54, resulting in a "best fit" plane of the optical fibers 53 that is substantially parallel to both the plane defined by the reference surface 68 and the plane defined by the end face reference surface 58. The reference surface 68 may be used to verify the geometry of the end face reference surface 58 both before and after polishing. In order to determine angularity between the reference surfaces 58 and 68, the reference surfaces 58, 68 may be measured and compared using a non-interference vision system. In alternative embodiments, an interference vision system may be used to determine angularity. The surfaces may be measured and compared to determine relative parallelness. As stated above, it is desirable that the reference surfaces 58, 68 are substantially parallel, and more preferably, exactly parallel. It is also desirable that the end face reference surface 58 be polished normal to the longitudinal axis $A_1$ of the ferrule body 54, particularly in the direction of its long axis (i.e., X-direction) or at a desired angle such as 8 degrees.

In one embodiment, to polish the end face 56 generally perpendicular to the fiber bores 60 in the ferrule 50 of FIGS. 3A-3D, the ferrule 50 is held into place by a polishing jig or other polishing machine (not shown). The polishing jig holds the ferrule 50 in alignment with respect to the polishing members or other device that polishes the optical fibers 53 in the end face 56 of the ferrule 50 in co-planarity. If the ferrule 50 is not held in place in a known and precise alignment, the bumpers 64A, 64B will also not be precisely aligned to provide a polishing plane to obtain co-planarity of the optical fibers 53. Measurement of co-planarity also requires that the ferrule 50 is held precisely at a known distance and alignment. Thus, it is important that the polishing jig holds the ferrule 50 precisely in a known manner and such that the end face 56 of the ferrule body 54 is precisely aligned with the polisher to precisely and evenly polish the end face 56 generally perpendicular to the fiber bores 60 in the ferrule 50.

Figure 4:
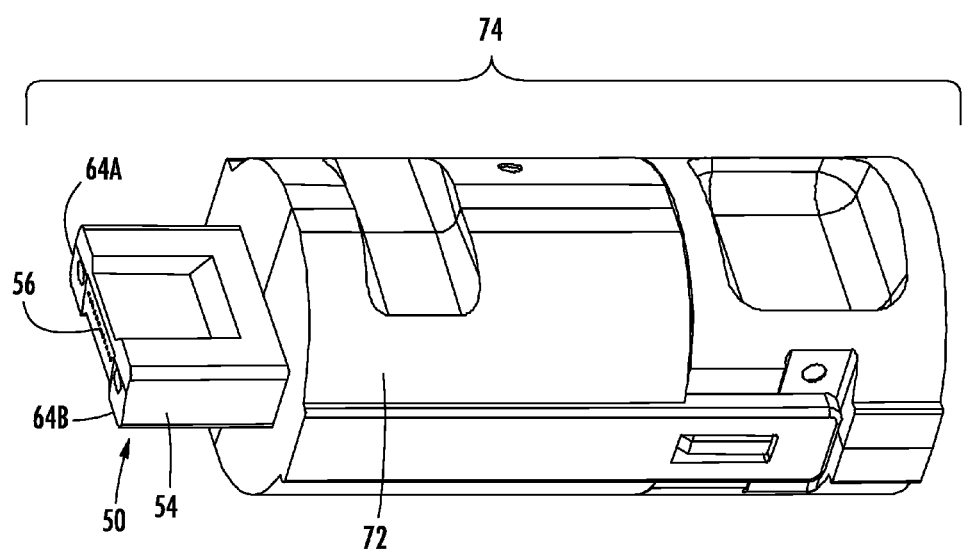
FIG. 4 is a perspective, right side view of the MTP ferrule in FIGS. 3A-3D disposed in a ferrule retainer to provide a ferrule assembly.

In this regard, as illustrated in FIGS. 3A-3D, the ferrule body 54 includes alignment features in the form of shoulder features 70A, 70B (hereinafter referred to as alignment features 70A, 70B). For example, a spring provided in a ferrule assembly 74 (FIG. 4) may properly seat the ferrule 50 for aligning the end face 56 for polishing. The alignment features 70A, 70B can be used as alignment features for reference by the polishing jig to ensure a precise distance and alignment between the end face 56 of the ferrule body 54 and a polisher for polishing the optical fibers 53 in co-planarity. However, the alignment features 70A, 70B must be accessible to be used for referencing the ferrule 50. The alignment features 70A, 70B are not accessible in the ferrule assembly 74 of FIG. 4 when the ferrule 50 is disposed inside a ferrule retainer 72. Thus, a polishing jig could alternatively be configured to reference the bumpers 64A, 64B of the ferrule 50, or the ferrule retainer 72 that retains the ferrule 50 in the assembled ferrule assembly 74 of FIG. 4. It may also be desired to reference the bumpers 64A, 64B of the ferrule 50, or the ferrule retainer 72 to reference the ferrule 50 if there are tolerance differences between alignment features between different ferrule designs. It may be desired to have the ability to reference both the alignment features 70A, 70B, and the bumpers 64A, 64B of the ferrule 50 or the ferrule retainer 72 that retains the ferrule 50.

Thus, the embodiments disclosed herein, examples of which are discussed below in more detail, include ferrule retainers for retaining and supporting fiber optic ferrules in an optical fiber connector. The ferrule retainers disclosed herein may be configured to support either single-fiber or multi-fiber ferrules. In one embodiment, the ferrule retainers include one or more access windows for accessing an alignment feature(s) of the ferrule located inside the ferrule retainer when the ferrule is assembled in the ferrule retainer. In this manner, the alignment feature(s) of the ferrule is accessible for referencing, if desired, when processing (e.g., polishing) the optical fiber(s) disposed in the ferrule when the ferrule is assembled in the ferrule retainer. The access window(s) provided in the ferrule retainers allows fiber processing equipment to reference the alignment feature(s) of the ferrule when assembled in a ferrule retainer regardless of whether the fiber processing equipment also references the ferrule retainer to reference the ferrule.

Figure 5:
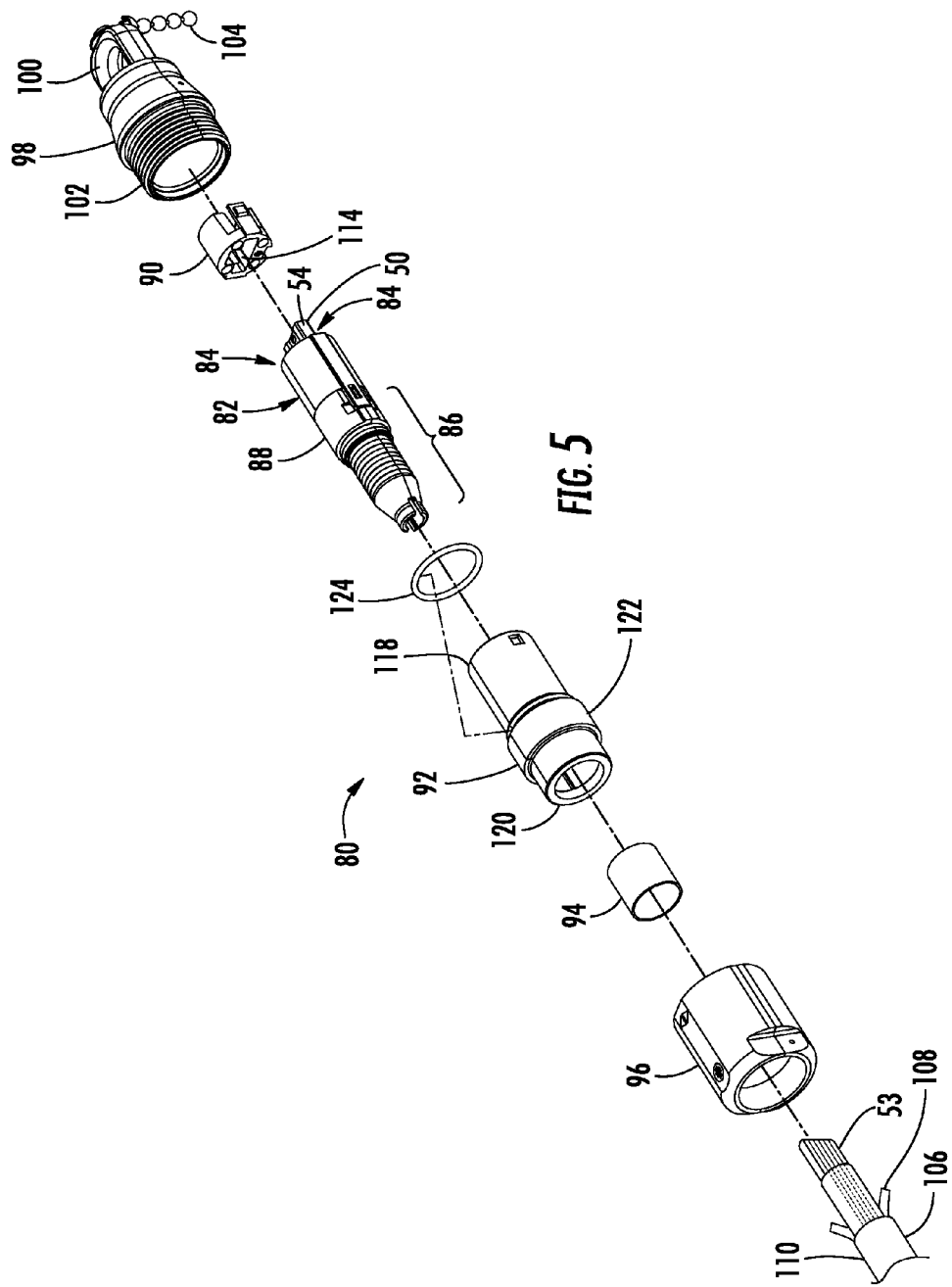
FIG. 5 is an exploded, perspective view of an exemplary MTP ferruled fiber optic plug that includes a ferrule retainer having access windows for accessing alignment features of an MTP ferrule disposed within the ferrule retainer when assembled in a ferrule assembly.

In this regard, FIG. 5 illustrates is an exploded, perspective view of an exemplary multi-fiber termination push-on (MTP) ferruled fiber optic plug 80 (also referred to as "fiber optic plug 80"). The fiber optic plug 80 includes a ferrule retainer 82 designed to retain the ferrule 50 in FIGS. 3A-3C. The ferrule retainer 82 also includes access windows 84. The access windows 84 in the ferrule retainer 82 allow access to the alignment features 70A, 70B disposed in the ferrule body 54 of the ferrule 50 when the ferrule 50 is disposed in the ferrule retainer 82 to form a ferrule assembly 86. More details on the access windows 84 provided in the ferrule retainer 82 are illustrated in FIGS. 7A-7E, described below. Before discussing the access windows 84 in the ferrule retainer 82 provided as part of the ferrule assembly 86, illustrated in detail in FIGS. 7A-7E, an exemplary fiber optic plug and fiber optic plug assembly that include the ferrule assembly 86 are first discussed in more detail with regard to FIG. 5 and FIGS. 6A-6C, respectively.

With reference back to FIG. 5, the fiber optic plug 80 includes a plug sub-assembly 88, an alignment sleeve 90, an outer housing 92, a crimp band 94, and a coupling nut 96.

During shipping and deployment, a protective pulling cap 98 may be threaded onto the fiber optic plug 80 using the coupling nut 96. The pulling cap 98 defines a pulling loop 100, a threaded portion 102 for engaging the coupling nut 96, and a tether 104 that may be attached to a drop cable 106 to retain the pulling cap 98 with the fiber optic plug 80. There may also be a molded-on plug boot (not shown) made of a flexible (silicone-type or other like) material secured over a rear portion of the outer housing 92 and a portion of the drop cable 106 in order to seal the exposed portion of the drop cable 106 while generally inhibiting kinking and providing bending strain relief to the drop cable 106 near the fiber optic plug 80. Strength components 108 are terminated, and the crimp band 94 is secured around the strength components 108. The crimp band 94 is preferably made from brass, but other suitable deformable materials may be used. The strength members (not shown) are cut flush with a stripped back cable jacket 110, thereby exposing the strength components 108 and an optical fiber ribbon comprising a plurality of ribbonized optical fibers 53. The crimp band 94 provides strain relief for the drop cable 106. The plug sub-assembly 88 is assembled by first crimping the crimp band 94 around a rear knurled portion. As is well understood by those of ordinary skill in the art, the outer housing 92 and the coupling nut 96 are threaded onto the drop cable 106 before the plug sub-assembly 88. The outer housing 92 is then slid over the plug sub-assembly 88.

Figure 11:
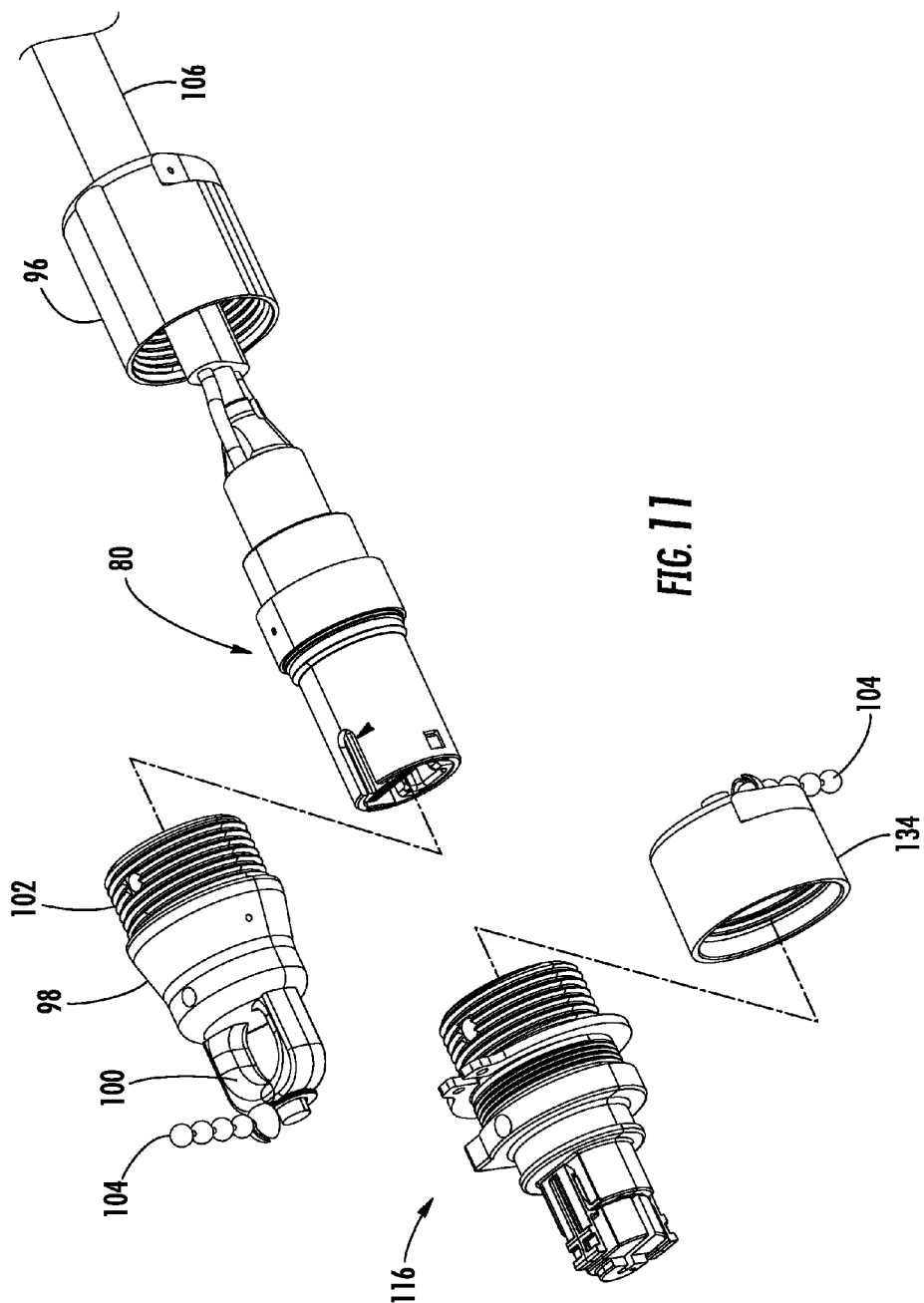
FIG. 11 is a perspective view of a multi-fiber fiber optic receptacle and fiber optic plug assembly of FIG. 5.

With continuing reference to FIG. 5, the alignment sleeve 90 defines a lengthwise passageway 114 for receiving the ferrule 50 and a receptacle ferrule when the fiber optic plug 80 is mated with a receptacle 116 (see FIG. 11). As stated herein, the alignment sleeve 90 may be a component of either the fiber optic plug 80 or the receptacle 116 (FIG. 11). In the exemplary embodiment shown and described herein, the alignment sleeve 90 is a component of the fiber optic plug 80. The outer housing 92 has a generally cylindrical shape with a forward first end 118 and a rearward second end 120. The outer housing 92 generally protects the plug sub-assembly 88 and in certain embodiments also aligns and keys engagement of the fiber optic plug 80 with the mating receptacle 116 (FIG. 11). Moreover, the outer housing 92 includes a through passageway between the first and second ends 118, 120. The passageway of the outer housing 92 includes an alignment and keying feature so that the plug sub-assembly 88 is inhibited from rotating once the fiber optic plug 80 is assembled.

With continuing reference to FIG. 5, the outer housing 92 of the fiber optic plug 80 may further define a shoulder 122 that serves as a mechanical stop for a conventional elastomeric O-ring 124 against a forward radial surface thereof and for the coupling nut 96 against a rearward radial surface thereof. The O-ring 124 provides an environmental seal when the coupling nut 96 engages the threaded portion of the receptacle housing of the receptacle 116 (FIG. 11). The coupling nut 96 has a passageway sized to loosely fit over the second end 120 and the shoulder 122 of the outer housing 92 so that the coupling nut 96 easily rotates about the outer housing 92. In other words, the coupling nut 96 cannot move in the direction of the receptacle 116 beyond the shoulder 122, but is able to rotate freely with respect to the outer housing 92.

Figure 6A:
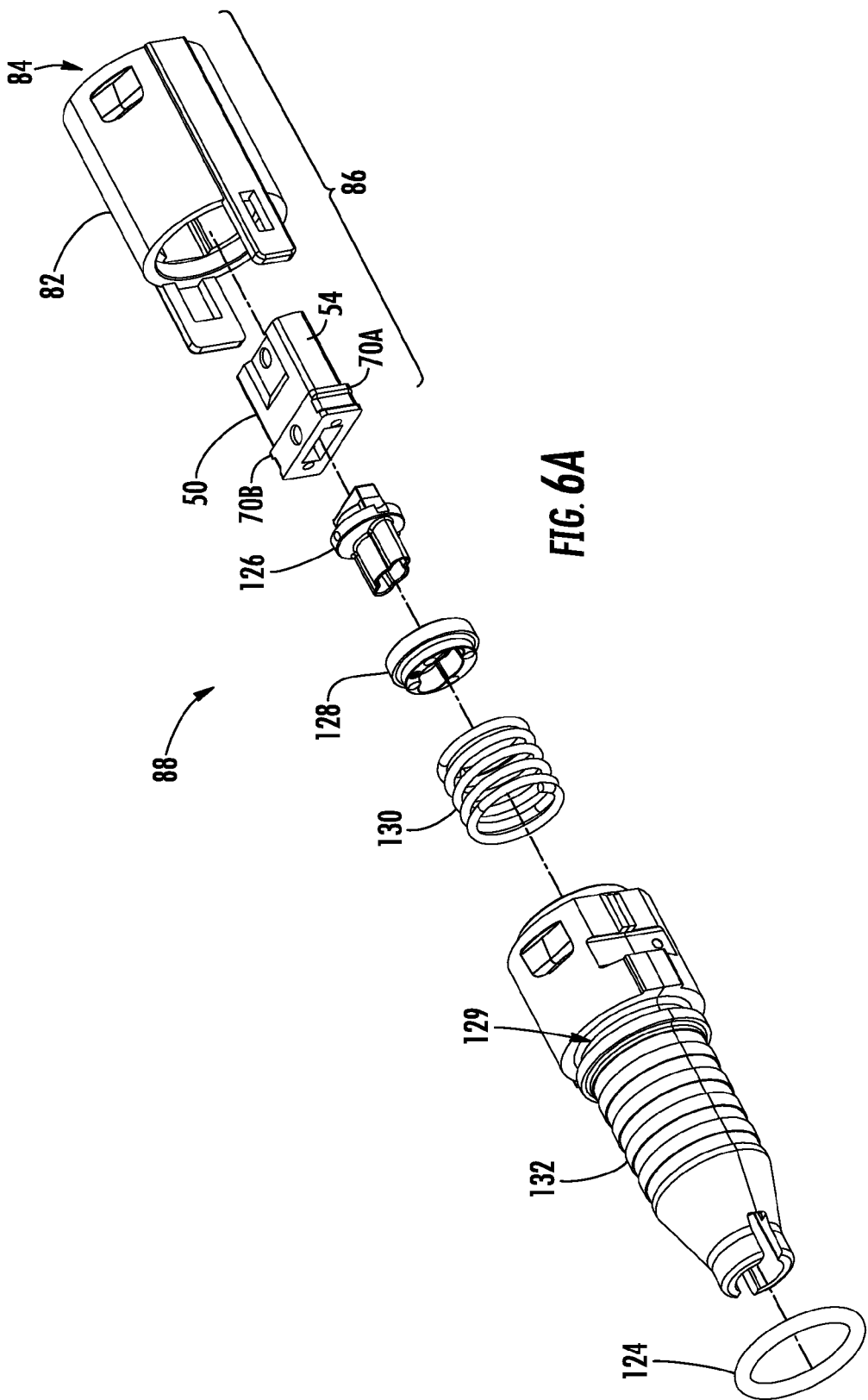
FIG. 6A is an exploded, perspective view of the MTP ferruled fiber optic plug sub-assembly of FIG. 5.
Figure 6B:
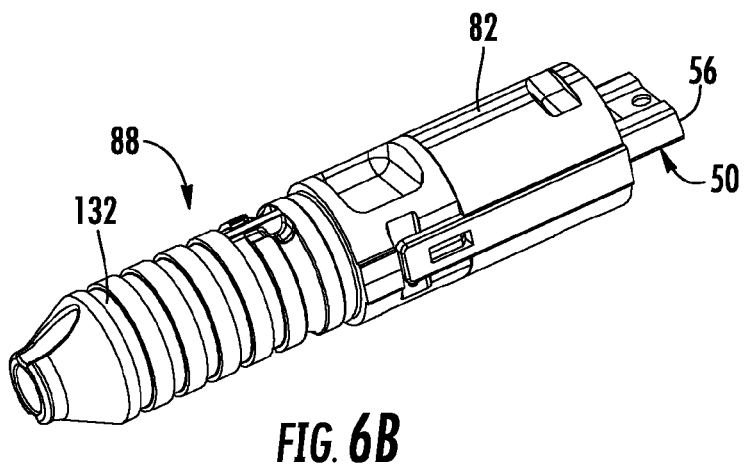
FIGS. 6B and 6C are left and right perspective, assembled views, respectively, of the MTP ferruled fiber optic plug sub-assembly in FIG. 6A.
Figure 6C:
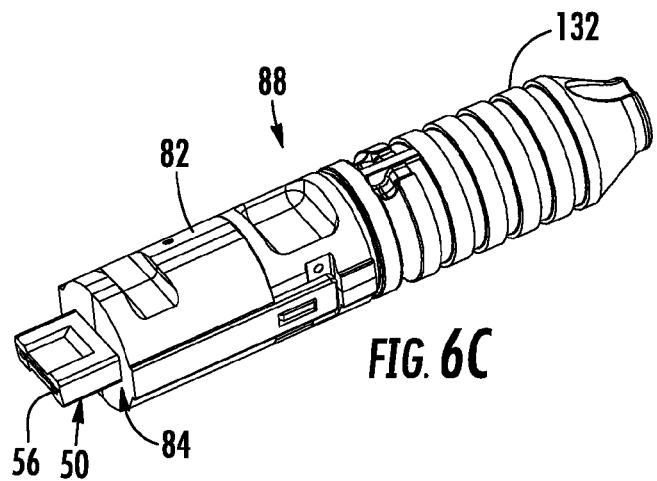

FIG. 6A is an exploded, perspective view of the MTP ferruled plug sub-assembly 88 of FIG. 5. FIGS. 6B and 6C are left and right perspective, assembled views, respectively, of the MTP ferruled fiber optic plug sub-assembly 88 in FIG. 6A. The plug sub-assembly 88 comprises the ferrule 50, a ferrule boot 126, a spring centering cuff 128, a round spring 130, a crimp insert 132, and the ferrule retainer 82, which may also be known as an inner housing. The ferrule 50 is at least partially disposed within the ferrule retainer 82, and extends lengthwise and protrudes outwardly therefrom into the alignment sleeve 90 (FIG. 5). The ferrule 50 is mounted within the ferrule retainer 82 such that the end face 56 of the ferrule 50 extends somewhat beyond the forward end of the ferrule retainer 82. As with the fiber optic receptacle 116 (FIG. 11), the fiber optic plug 80 includes a corresponding ferrule 50, preferably of like configuration. The fiber optic plug 80 of the exemplary embodiment is shown to include a single 12-fiber MT-style ferrule 50. The plug sub-assembly 88 may also include the O-ring 124 that seats within a groove 129 defined by the crimp insert 132. The O-ring 124 serves to provide a seal between the crimp insert 132 and the outer housing 92 when the coupling nut 96 engages the threaded portion of the protective pulling cap 98 or the receptacle 116 (FIG. 11).

With continuing reference to FIG. 6A, the fiber optic plug 80 likewise includes the biasing member assembly comprising the round spring 130, the spring centering cuff 128, and the ferrule boot 126. The biasing member assembly operably engages the ferrule 50 and a radial surface provided on the forward end of the crimp insert 132 to urge the ferrule 50 toward the first end 118 of the outer housing 92 (FIG. 5). The round spring 130 in conjunction with the ferrule boot 126 and the spring centering cuff 128 are operable in the manner described herein to apply a spring biasing force that is centered on the end face of the ferrule 50. In preferred embodiments, the biasing force of the round spring 130 is applied on the end face 56 of the ferrule 50 along the longitudinal axis defined by the fiber optic plug 80, or is balanced about one or more lateral axes defined by the end face 56 of the ferrule 50 such that the resultant biasing force causes the plane defined by the end face 56 of the ferrule 50 to be substantially normal to the longitudinal axis defined by the fiber optic plug 80. The forward end of the round spring 130 seats against the rear of the spring centering cuff 128, which aligns the round spring 130 and couples the spring force to the ferrule boot 126.

With continuing reference to FIG. 6A, the spring centering cuff 128 comprises a bowl-shaped (i.e., generally concave) forward surface that bears against a domed-shaped (i.e., generally convex) rear surface on the ferrule boot 126 to provide a centralized force application to the lateral center of the end face 56 of the ferrule 50. The rear surface of the ferrule boot 126 has a slightly smaller radius than the forward surface of the centering cuff 128 so that the bowl-shaped surface of the spring centering cuff 128 fits over the entire domed-shaped surface of the ferrule boot 126. The lower the friction between the spring centering cuff 128 and the ferrule boot 126, the more centered the resulting biasing force will be relative to the optical fiber array. The ferrule boot 126 is preferably made of a stiff elastomer, with optional low-friction properties or post-treatment, such that it will not deform under the pressure exerted by the round spring 130 and can be inserted into the rear of the ferrule 50 without cracking. The elastomer material further provides a slight interference fit for sealing against the rear of the ferrule 50. As a result, the ferrule boot 126 functions to prevent epoxy from leaking between the ferrule boot 126 and the ferrule 50. The rear end of the ferrule boot 126 defines a reception window (funnel) for inserting the optical fibers 53 in both pre-assembled and discrete configurations. As previously stated, the rear of the ferrule boot 126 defines a domed-shaped surface that has its theoretical focal point aligned with the lateral center of the end face 56 of the ferrule 50. Thus, the ferrule boot 126 simultaneously provides sealing, fiber guiding and centered force application functions.

The ferrule 50 is spring-biased by the round spring 130, but is allowed to float axially within the ferrule retainer 82 and the alignment sleeve 90 to thereby absorb compressive forces between the ferrule 50 and the opposing receptacle 116 (FIG. 11), which is preferably spring-biased by a corresponding round spring 130. The round spring 130 seats against a forward radial surface of the crimp insert 132 such that the round spring 130 is slightly pre-compressed between the crimp insert 132 and the spring centering cuff 128. As previously discussed, the spring centering cuff 128 seats against the bearing surface of the ferrule boot 126 to center the resultant spring biasing force on the center of the end face of the ferrule 50. The rear of the ferrule boot 126 defines a reception window (funnel) for guiding the optical fibers 53 into the ferrule boot 126 and the ferrule 50.

FIGS. 7A-7E are perspective front, perspective rear, front, top, and side views, respectively, of the ferrule retainer 82 of the ferrule assembly 74 of the MTP ferruled fiber optic plug sub-assembly 88 in FIGS. 6A-6C. As will be discussed in more detail below, the ferrule retainer 82 is configured to receive and support the ferrule 50 in FIGS. 3A-3E in an optical fiber connector assembly, for example, the fiber optic plug 80 in FIGS. 5-6C discussed above. In this regard, the ferrule retainer 82 comprises a retainer body 140. The retainer body 140 in this example is generally cylindrical shaped. The retainer body 140 may be constructed from a mold and a polymer material, if desired. The retainer body 140 may include a keyed section 142 to assist in proper alignment of the coupling nut 96 and/or the ferrule boot 126 form fitting with the retainer body 140 when assembled in the fiber optic plug 80 (FIG. 5). The retainer body 140 also includes an interior chamber 144 that is disposed within the retainer body 140. The interior chamber 144 is disposed along a longitudinal axis $A_2$ of the retainer body 140 in this example. Likewise, the interior chamber 144 is configured to support the ferrule 50 along the longitudinal axis $A_1$ of the retainer body 140 in the fiber optic plug 80, as also illustrated FIGS. 6A-6C.

Figure 7A:
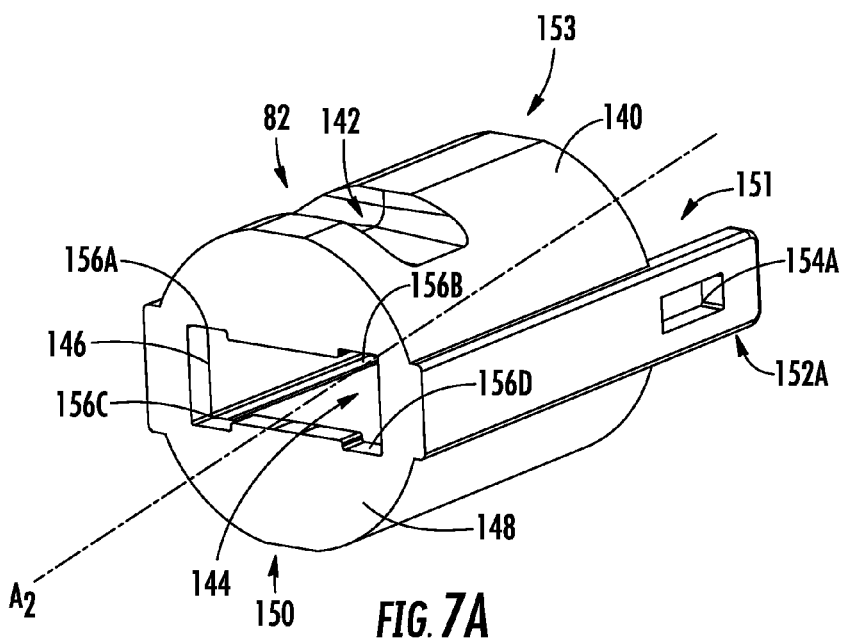
FIGS. 7A-7E are perspective front, perspective rear, front, top, and side views, respectively, of the ferrule retainer of the ferrule assembly of the MTP ferruled fiber optic plug sub-assembly of FIGS. 6A-6C.
Figure 7B:
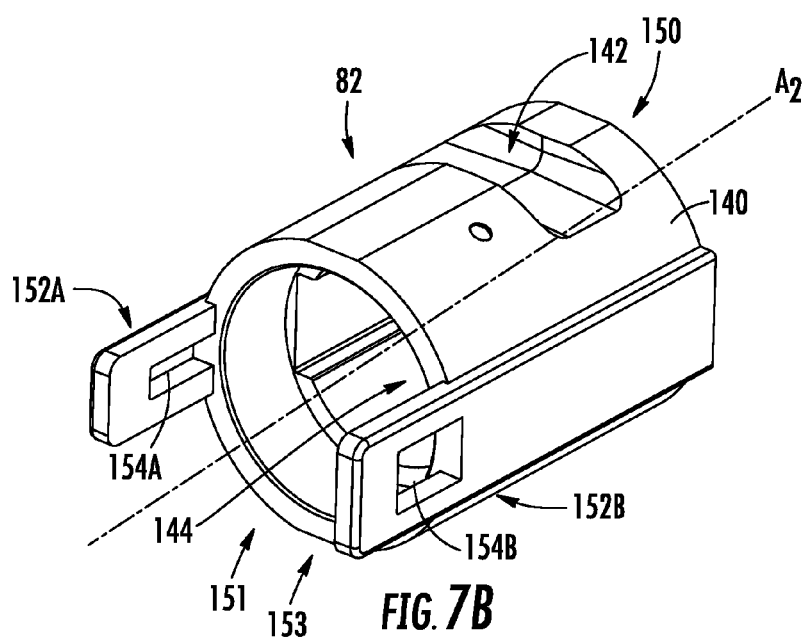
Figure 7C:
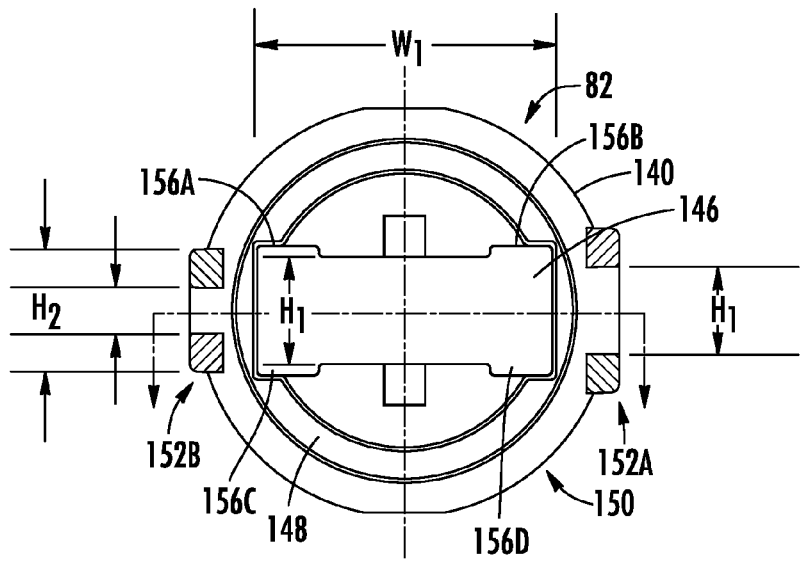
Figure 7D:
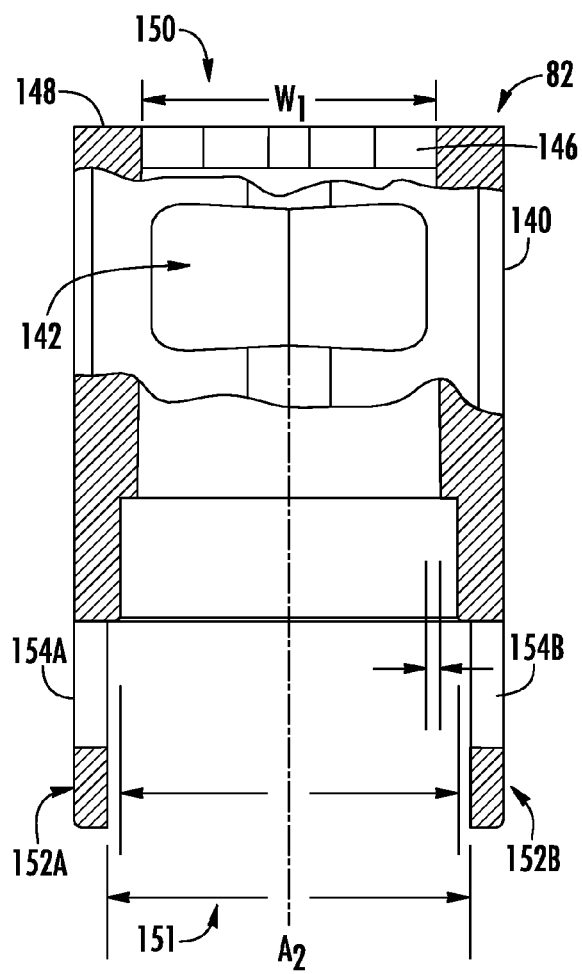
Figure 7E:
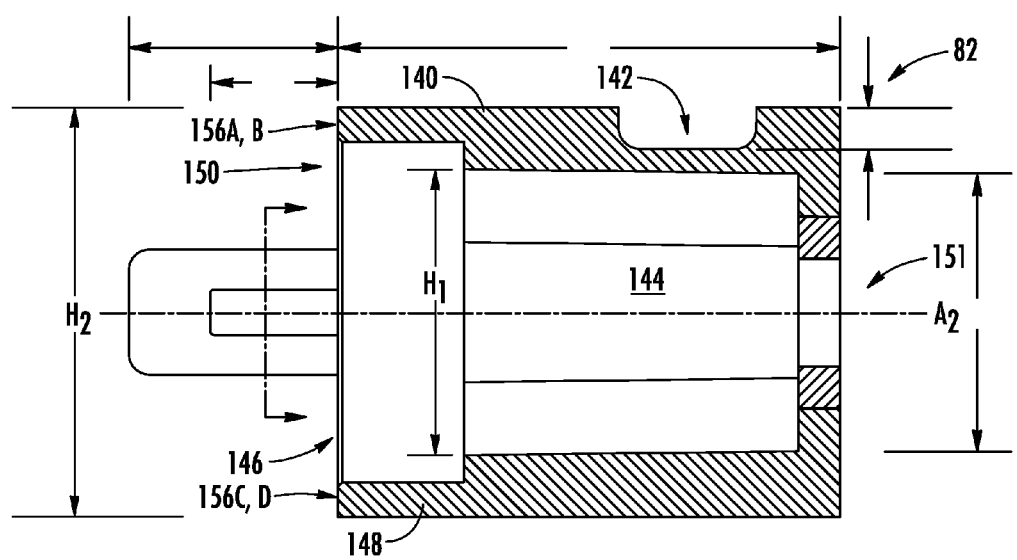

A first opening 146 is also provided through a portion 148 of a first end 150 of the retainer body 140 as illustrated in FIGS. 7A and 7C-7E. The first opening 146 is in communication with the interior chamber 144 and is configured to allow the end face 56 of a retained ferrule 50 in the interior chamber 144 to be disposed through the first opening 146 to allow the ferrule 50 to be mated with the receptacle 116 (FIG. 11). In this embodiment, the first opening 146 is configured to be of width $W_1$, as illustrated in FIG. 7C, to receive the end face 56 of an MTP-type ferrule, but the disclosure herein is not limited to any particular type or style of ferrule.

With continuing reference to FIGS. 7A-7E, the retainer body 140 also includes a second opening 151 disposed at a second end 153 of the retainer body 140 opposite the first end 150. The second opening 151 is also in communication with the interior chamber 44 in this embodiment. The second opening 151 is configured to initially receive the end face 56 of the ferrule 50 as the ferrule 50 is inserted into the retainer body 140 and the end face 56 of the ferrule 50 is subsequently disposed through the first opening 146. Retention mechanisms 152A, 152B are also integrally molded into the retainer body 140 in this example. The retention mechanisms 152A, 152B each contain openings 154A, 154B that are configured to receive protrusions from the ferrule boot 126 to help secure the ferrule retainer 82 to the ferrule boot 126.

In this embodiment with continuing reference to FIGS. 7A-7E, the ferrule body 140 of the ferrule retainer 82 contains access windows 156A-156D as best shown in FIG. 7C. The access windows 156A-156D are configurations disposed in the first end 150 that create additional accesses to the interior chamber 144 of the retainer body 140 even when a ferrule body 154 is disposed through the first opening 146. The access windows may include separate openings in the first end 150 that are disposed in one or more portions of the first end 150 separate from the first opening 146 and not in communication with the first opening 146. Alternatively, as shown, the access windows 156A-156D in this embodiment are openings in the first end 150 that are in communication with the first opening 146 which, in effect, extend at least one dimension of the first opening 146 in at least a portion of the first opening 146.

In the embodiment of the retainer body 140 in FIGS. 7A-7E, the access windows 156 are disposed in communication with the first opening 146 at the first end 150 of the retainer body 140 where the end face 56 of the ferrule 50 retained in the interior chamber 144 is exposed. The access windows 156 are configured to allow access to the alignment features 70A, 70B (FIGS. 3A-3E) in the ferrule body 54 of the ferrule 50 retained in the ferrule retainer 82 even when the end face 56 of the ferrule 50 is disposed through the first opening 146. In this manner as will be discussed below in more detail with regard to FIGS. 8A-8E, even when the ferrule 50 is assembled in the ferrule retainer 82 as part of the ferrule assembly 86 or the fiber optic plug 80, the alignment features 70A, 70B of the ferrule 50 are accessible to be used for referencing the ferrule 50 to provide preparations for the optical fibers 53, including polishing, as previously discussed. More detail regarding and exemplary process for referencing the ferrule 50 in the fiber optic plug 80 is described below in more detail with regard to FIGS. 8A-8E.

With continuing reference to FIGS. 7A-7E, in this embodiment, four access windows 156A-156D are disposed in the first opening 146. However, note that any number of access windows 156 may be provided as desired. Also in this embodiment, the access windows 156A-156D are each disposed in a corner section of the first opening 146 to form an H-shaped first opening 146 with the access windows 156A, 156B disposed in the first opening 146. In this embodiment as illustrated in FIG. 7C, the first opening 146 is of a height $H_1$ in an interior portion of the first opening 146. To provide the access windows 156A-156D to allow access into the interior chamber 144 of the retainer body 140 even when the end face 56 of the ferrule 50 is disposed through the first opening 146, the access windows 156A-156D are disposed in the first opening 146 to extend to a height $H_2$, wherein the height $H_2$ is greater than the height $H_1$. For example only, the height $H_2$ may be at least 0.2 mm greater than the height $H_1$. The height $H_1$ may be between 2.50 and 2.70 mm, and the height $H_2$ may be greater than 2.80 mm.

Because of the access windows 156A-156D in the ferrule retainer 82 in FIGS. 7A-7E, the ferrule 50 retained in the ferrule retainer 82 can be referenced when the ferrule 50 is assembled in the ferrule retainer 82. An exemplary referencing platform and method of referencing the ferrule 50 when assembled in the ferrule retainer 82 is discussed below with respect to FIGS. 8A-8E. As previously discussed, providing a manner and method to reference the ferrule 50 when assembled in the ferrule retainer 82 may be advantageous to allow referencing off features of the ferrule 50 that are retained inside the ferrule retainer 82 when assembled.

Figure 8A:
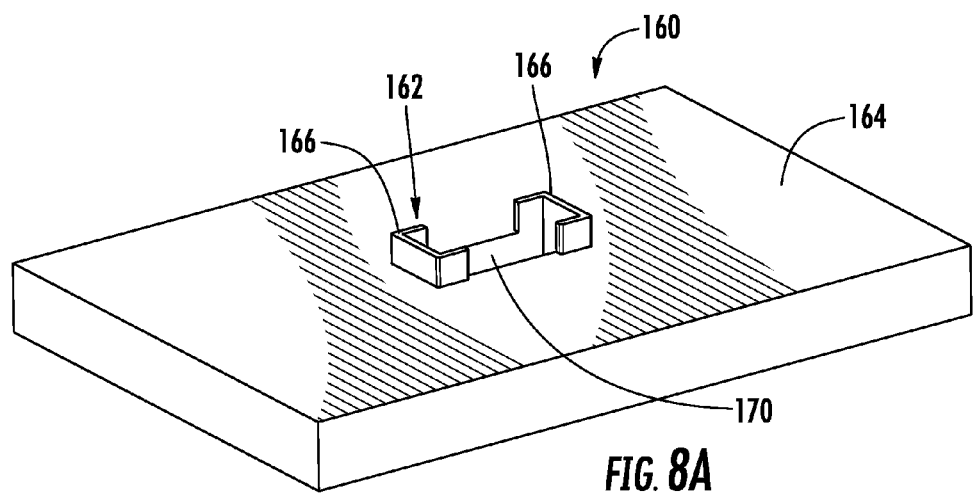
FIG. 8A is a perspective view of a referencing platform having reference features disposed thereon for being received through the access windows of the ferrule retainer of FIGS. 7A-7E for accessing and/or referencing alignment features of the MTP ferrule in the ferrule assembly of the MTP ferruled fiber optic plug sub-assembly of FIGS. 6A-6C.

In this regard, FIG. 8A is a perspective view of a referencing platform 160 that may include a support surface 164 that is engineered to be precisely planar to precisely reference the retainer body 140. The reference features 162 are configured to abut against and reference the alignment features 70A, 70B disposed in the ferrule body 54 as previously discussed. Once the ferrule 50 is referenced, preparations of the optical fibers 53 disposed can be provided in a known and co-planar manner. As illustrated in FIG. 8A, the reference features 162 are configured to be complementary to the geometry of the access windows 156A-156D disposed in the ferrule retainer 82. In this manner, the access windows 156A-156D can receive the reference features 162 through the first end 150 or the first opening 146 of the ferrule retainer 82 to reference the ferrule 50 disposed in the ferrule retainer 82. This is illustrated in FIG. 8B, discussed below.

Figure 8B:
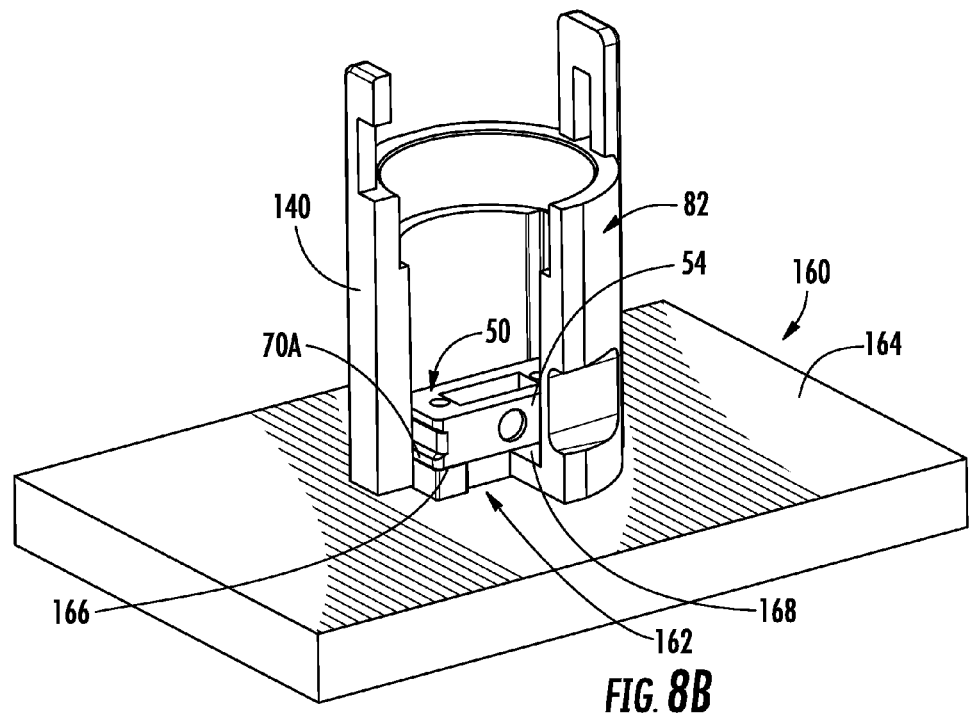
FIG. 8B is a perspective, quarter-sectioned view of access windows of the ferrule retainer of the MTP ferruled fiber optic plug sub-assembly of FIGS. 6A-6C receiving the reference features of the referencing platform in FIG. 8A for accessing the alignment features in the MTP ferrule.
Figure 8C:
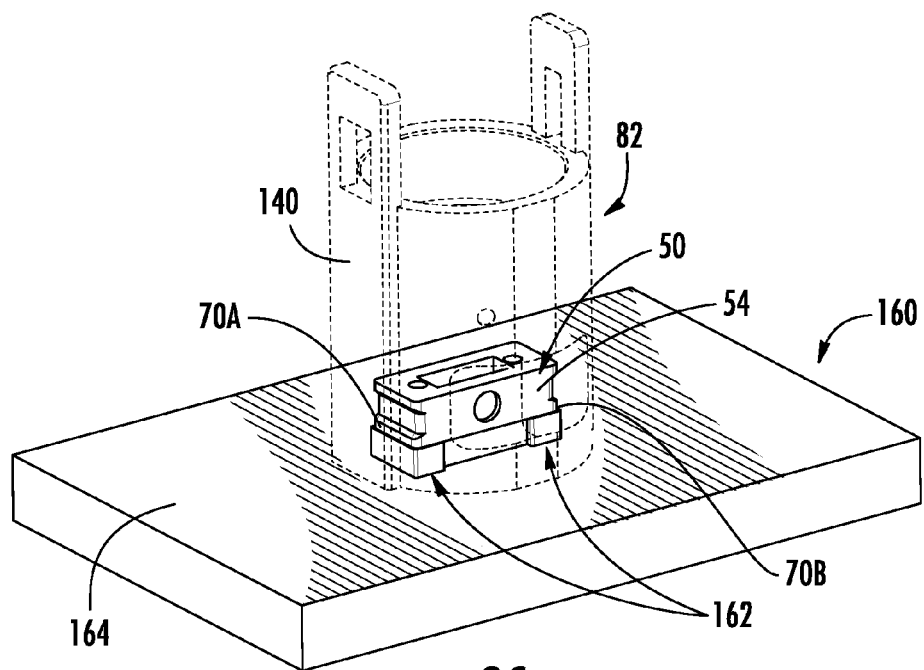
FIG. 8C shows the access windows of FIG. 8B with the ferrule retainer of the ferrule assembly of the MTP ferruled fiber optic plug sub-assembly in FIGS. 6A-6C illustrated in hidden lines to show the alignment features in the MTP ferrule referenced by the reference features of the referencing platform in FIG. 8A.
Figure 8D:
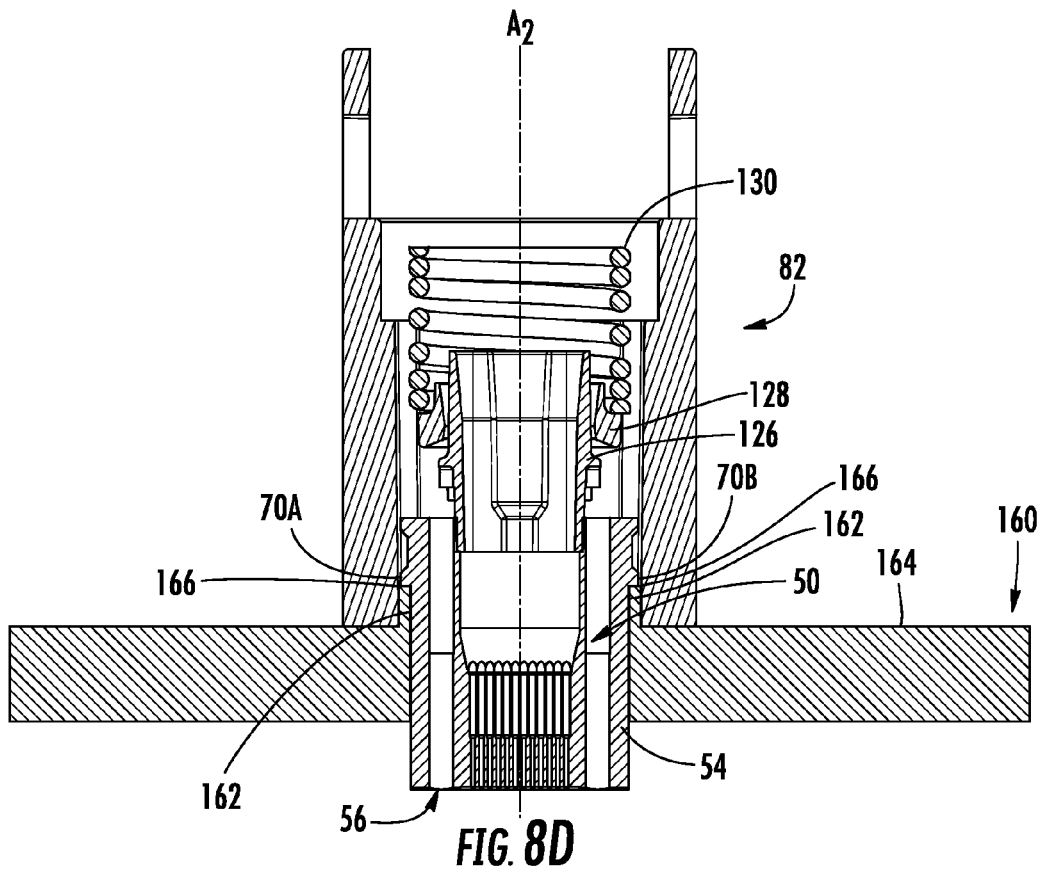
FIGS. 8D and 8E are front and side cross-sectioned views, respectively, of the MTP ferruled fiber optic plug subassembly such as shown in FIG. 8B.
Figure 8E:
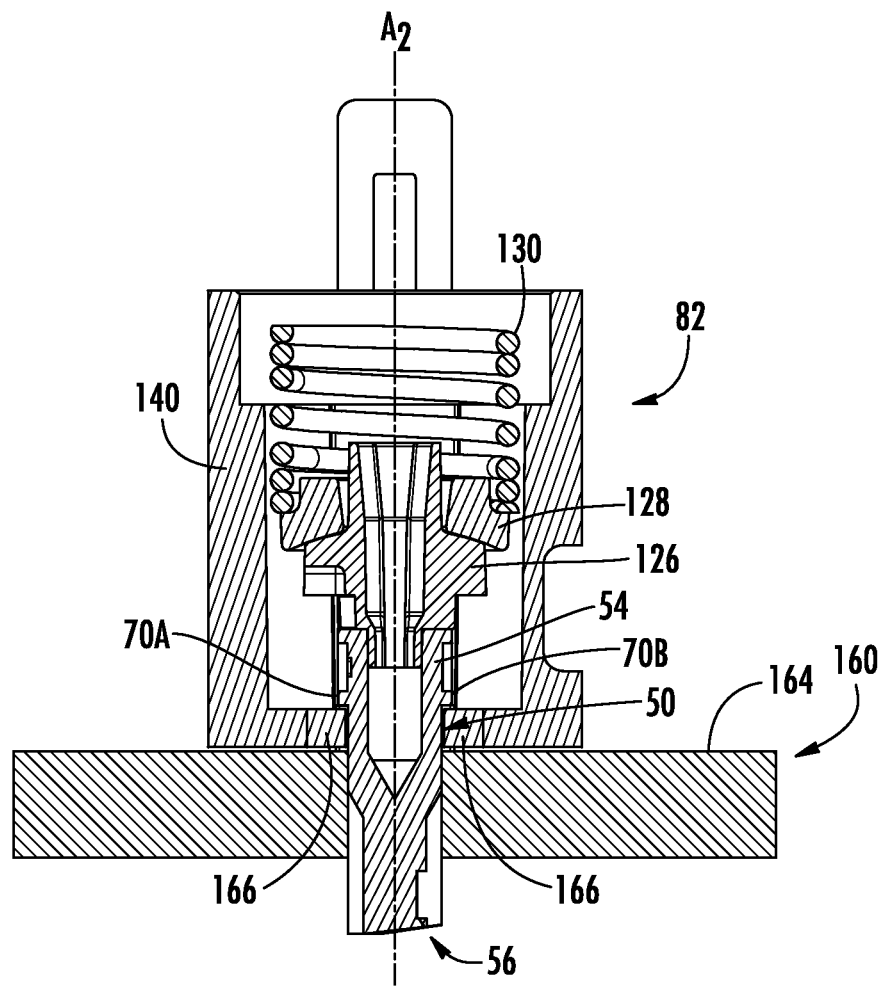

FIG. 8B is a perspective, quarter-sectioned view of access windows 156A-156D of the ferrule retainer 82 of the ferrule assembly 88 of FIGS. 6A-6C receiving the reference features 162 of the referencing platform 160 in FIG. 8A for accessing the alignment features 70A, 70B in the ferrule 50. FIG. 8C is FIG. 8B with the ferrule retainer 82 of the ferrule assembly 88 in FIGS. 6A-6C illustrated in hidden lines to show the alignment features in the ferrule 50 referenced by the reference features 162 of the referencing platform 160 in FIG. 8A. FIGS. 8D and 8E are front and side cross-sectioned views, respectively, of FIG. 8B.

As illustrated in FIGS. 8B-8E, the first end 150 in the retainer body 82 is sized in this embodiment to not allow the alignment features 70A, 70B of the ferrule body 54 to be disposed through the first opening 146 within the interior chamber when the end face 56 of the ferrule 50 is disposed through the first opening 146. As illustrated in FIG. 8B, an interior surface 168 of the first end 150 adjacent to the first opening 146 is configured to interfere with the alignment features 70A, 70B of the ferrule 50 to retain the alignment features 70A, 70B in the interior chamber of the retainer body 140 when the end face 56 of the ferrule 50 is disposed through the first opening 146. The ferrule retainer 82 with the ferrule 50 disposed therein is disposed such that an end surfaces 166 of the reference features 162 abut the alignment features 70A, 70B of the ferrule body 54 to reference the ferrule 50. In this embodiment, the first end 150 of the ferrule retainer 82 is also abutted against the support surface 164 of the referencing platform 160 as a second referencing method. As illustrated in FIGS. 8D and 8E, the end face 56 is disposed through a cavity 170 (FIG. 8A) in the referencing platform 160 interior to the reference features 162. The optical fibers 53 in the end face 56 of the ferrule 50 can then be polished or other preparations made. After optical fiber 53 preparations are made, the ferrule retainer 82 can be removed from referencing platform 160 wherein the reference features 162 are removed from the access windows 154A, 154B.

Figure 10A:
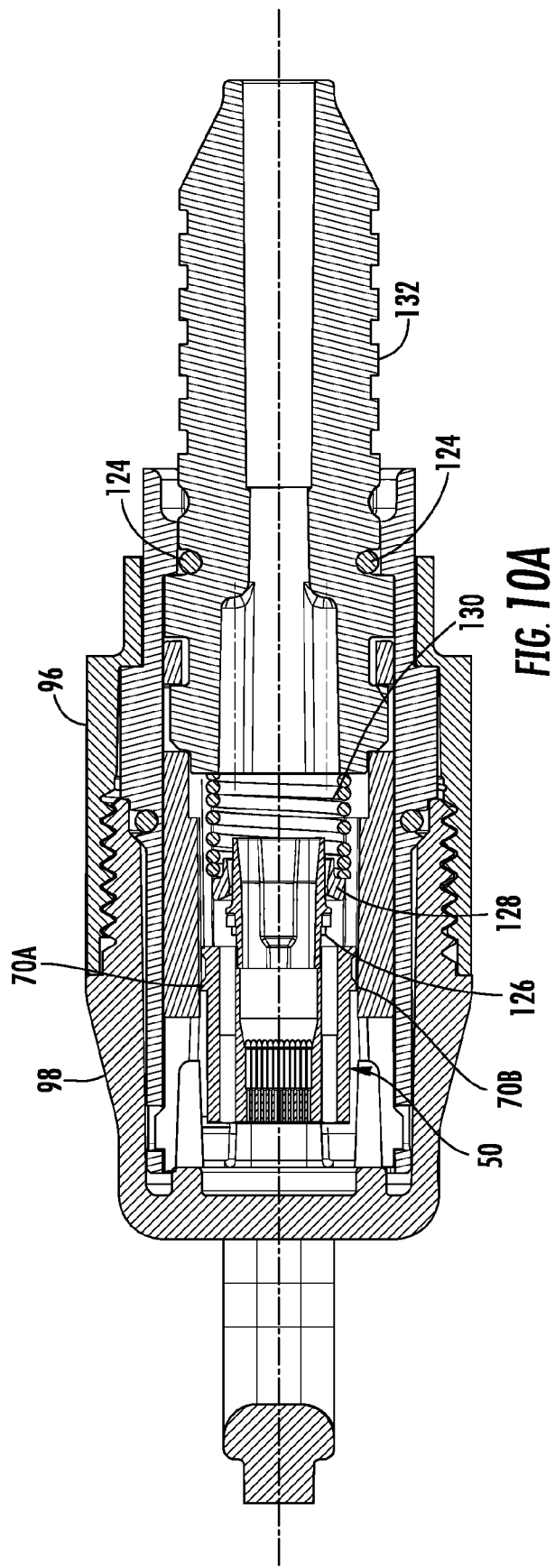
FIGS. 10A and 10B are right top and right side cross-sectioned assembled views, respectively, of the MTP ferruled fiber optic plug sub-assembly in FIGS. 9A and 9B.
Figure 10B:
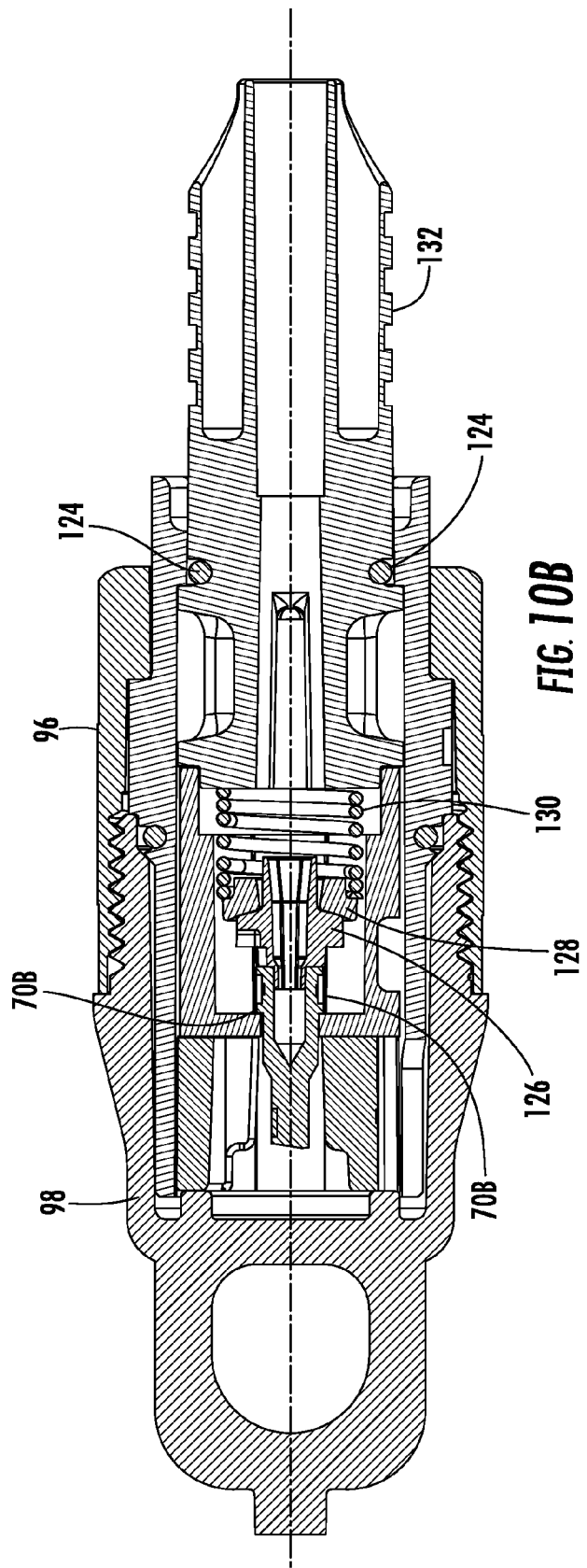

Once the optical fibers 53 disposed in the ferrule 50 have been polished, the pulling cap 98 may be secured to the coupling nut 96. This is illustrated in FIGS. 9A and 9B, which are left and right perspective assembled views, respectively, of the MTP ferruled fiber optic plug sub-assembly 88 in FIGS. 6A-6C. FIGS. 10A and 10B are right top and right side cross-sectioned assembled views, respectively, of the MTP ferruled fiber optic plug sub-assembly 88 in FIGS. 9A and 9B with the pulling cap 98 secured to the coupling nut 96.

FIG. 11 is a perspective view of a multi-fiber fiber optic receptacle 116 and the fiber optic plug assembly 80 of FIG. 5. The receptacle 116 and the corresponding fiber optic plug 80 are shown disengaged and with a protective dust cap 134 of the receptacle 116 and the protective pulling cap 98 of the fiber optic plug 80 removed. A threaded coupling nut 96 on the fiber optic plug 80 is operable for securing the fiber optic plug 80 to the receptacle 116 upon engagement and may also be used to secure the pulling cap 98 during shipping and deployment of the drop cable 106. The pulling cap 98 defines the threaded portion 102 at its rearward end and the pulling loop 100 at its forward end. The pulling cap 98 provides protection of the optical connector of the fiber optic plug 80 during shipping and deployment, and until engagement of the fiber optic plug 80 with the receptacle 116. The pulling cap 98 may be secured to the drop cable 106 using the tether 104 so that the pulling cap 98 may be reused if the fiber optic plug 80 is later disengaged from the receptacle 116. In preferred embodiments, the pulling loop 100 should be able to withstand cable-pulling forces up to about 600 lbs. The pulling loop 100 and the pulling cap 98 have a generally rounded forward end to facilitate deployment through conduits or ducts and over sheave wheels or pulleys. As with the fiber optic plug 80 of the assembly, the receptacle 116 may also be covered and sealed with the threaded protective dust cap 134 during shipping and deployment that is removed prior to inserting the fiber optic plug 80 into the receptacle 116. The dust cap 134 may likewise be secured to the receptacle 116 using a tether 104. At the end of the receptacle 116 opposite the dust cap 134, a pre-formed, elastomeric seal boot (not shown) may provide protection for the receptacle 116 from the environment within the connection terminal and in some embodiments may also provide a sealing function. The protective boot allows the assembly to be installed in a breathable connection terminal, or similar enclosure, and may be unnecessary in the event the receptacle 116 is otherwise reliably sealed from the environment.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings. For example, fiber optic connector assemblies are disclosed herein. However, the connector assembly does not have to include optical fibers. The connector assembly could include any type of communication line, including for example electrical. In this regard, the cables disclosed herein having at least one furcation tube disposed therein are not limited to fiber optic cables. The cables could include electrical cables, power cables, or any other type of cables. The cables could include more than one type of cable or communication line disposed there, such as a cable including both optical fibers and copper wires as an example. Further, the connector and adapter types disclosed herein are not limited. For example, duplex LC and MTP fiber optic connectors and adapters are disclosed herein. However, if the connectors and adapters are fiber optic connectors and adapters, other types may be provided, including but not limited to FC, SC, ST, and MPO, as examples. The terms "connector" and "adapter" are not limited. A "connector" can be provided in any form or package desired that is capable of providing a connection to allow one or more communications lines to be communicatively connected or coupled to other communications lines disposed in another adapter or connector in which the connector is attached.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A ferrule retainer configured to receive and support a fiber optic ferrule for an optical fiber connector assembly, comprising:
a retainer body;
an interior chamber disposed within the retainer body, the interior chamber disposed along a longitudinal axis of the retainer body;
an opening disposed through a portion of a first end of the retainer body, the opening in communication with the interior chamber and configured to allow an end face of a ferrule, disposed along the longitudinal axis of the retainer body, to be disposed through the opening; and
at least one access window disposed through a second portion of the first end of the retainer body to allow access to at least one alignment feature of the ferrule retained in the interior chamber of the retainer body when the end face of the ferrule is disposed through the opening, wherein the opening is sized to not allow the at least one alignment feature of the ferrule to be disposed through the opening within the interior chamber when the end face of the ferrule is disposed through the opening.

2. The ferrule retainer of claim 1, wherein an interior surface of the first end of the retainer body adjacent to the opening is configured to interfere with the at least one alignment feature of the ferrule to retain the at least one alignment feature in the interior chamber of the retainer body when the end face of the ferrule is disposed through the opening.

3. The ferrule retainer of claim 1, wherein the at least one access window is comprised of a plurality of access windows disposed in a plurality of second portions of the first end of the retainer body.

4. The ferrule retainer of claim 1, wherein the at least one access window is disposed in the second portion in communication with the first portion of the first end of the retainer body.

5. The ferrule retainer of claim 4, wherein the at least one access window extends the length of a first dimension of the opening.

6. The ferrule retainer of claim 4, wherein the opening has a first height in an interior portion of the opening, and the at least one access window extends the first height to a second height in an end portion of the opening.

7. The ferrule retainer of claim 6, wherein the second height is greater than the first height.

8. The ferrule retainer of claim 6, wherein the second height is at least 0.2 millimeters (mm) greater than the first height.

9. The ferrule retainer of claim 7, wherein the first height is between 2.50 and 2.70 mm and the second height is greater than 2.80 mm.

10. The ferrule retainer of claim 4, wherein the at least one access window is disposed on at least one corner section of the opening.

11. The ferrule retainer of claim 4, wherein the at least one access window is comprised of four access windows, each of the access windows disposed in a corner section of the opening to form an H-shaped opening.

12. The ferrule retainer of claim 1, wherein the opening has a width configured to allow the width of an end face of a multi-fiber termination push-on (MTP) ferrule to pass therethrough.

13. The ferrule retainer of claim 1, further comprising a second opening disposed at a second end of the retainer body opposite the first end of the retainer body, the second opening in communication with the interior chamber, the second opening configured to receive an end face of a ferrule before the end face of the ferrule is disposed through the opening.

14. An optical fiber connector assembly, comprising:
a ferrule having a ferrule body comprising a first end and a second end, an end face disposed on the first end, and at least one alignment feature disposed between the first end and the second end of the ferrule body; and
a ferrule retainer, comprising:
a retainer body;
an opening disposed through a portion of a first end of the retainer body and configured to allow the end face of the ferrule, disposed along the longitudinal axis of the retainer body, to be disposed through the opening; and
at least one access window disposed through a second portion of the first end of the retainer body to allow access to at least one alignment feature of the ferrule retained within the ferrule retainer and accessible through the at least one access window, wherein the at least one access window is disposed in the second portion in communication with the first portion of the first end of the retainer body and the at least one access window extends the length of a first dimension of the opening.

15. The optical fiber connector assembly of claim 14, further comprising an interior chamber disposed along a longitudinal axis of the ferrule retainer, the opening in communication with an interior chamber and disposed through a portion of a first end of the retainer body.

16. The optical fiber connector assembly of claim 15, wherein the at least one alignment feature of the ferrule abuts an interior surface of the first end of the retainer body adjacent to the opening to retain the at least one alignment feature of the ferrule in the interior chamber of the retainer body.

17. The optical fiber connector assembly of claim 14, wherein the at least one access window is comprised of a plurality of access windows disposed in a plurality of second portions of the first end of the retainer body.

18. The optical fiber connector assembly of claim 14, wherein the opening has a first height in an interior portion of the opening, and the at least one access window extends the first height to a second height in an end portion of the opening.

19. The optical fiber connector assembly of claim 18, wherein the second height is greater than the first height.

20. The optical fiber connector assembly of claim 18, wherein the second height is at least 0.2 mm greater than the first height.

21. The optical fiber connector assembly of claim 18, wherein the first height is between 2.50 and 2.70 mm and the second height is greater than 2.80 mm.

22. The optical fiber connector assembly of claim 14, wherein the at least one access window is disposed on at least one corner section of the opening.

23. The optical fiber connector assembly of claim 14, wherein the at least one access window is comprised of four access windows, each of the access windows disposed in a corner section of the opening to form an H-shaped opening.

24. The optical fiber connector assembly of claim 14, wherein a width of the ferrule body at the alignment feature is greater than the width of the opening.

25. The optical fiber connector assembly of claim 14, further comprising at least one fiber bore disposed through the end face of the ferrule body, the at least one fiber bore configured to receive at least one end portion of an optical fiber.

26. The optical fiber connector assembly of claim 14, wherein the ferrule retainer comprises at least one latch configured to attach to at least one latching feature of a receptacle housing to retain the ferrule retainer to form a connector assembly.

27. The optical fiber connector assembly of claim 26, wherein the ferrule retainer is seated in a spring-loaded ferrule boot disposed between the ferrule and the receptacle housing.

28. The optical fiber connector assembly of claim 27, further comprising a spring disposed between the ferrule boot and the receptacle housing to spring load the ferrule boot.

29. A method of referencing a ferrule in an optical fiber connector assembly, comprising:
providing a referencing platform having at least one reference feature;
receiving the at least one reference feature in at least one access window disposed in a second portion of a first end of a ferrule retainer, the ferrule retainer retaining a ferrule comprising an end face disposed through an opening disposed in a first portion of the first end of the ferrule retainer; and
abutting an end surface of the at least one reference feature to at least one alignment feature of the ferrule retained within the ferrule retainer.

30. The method of claim 29, wherein the at least one access window is comprised of a plurality of access windows disposed in a plurality of second portions of the first end of the ferrule retainer.

31. The method of claim 29, wherein the at least one access window is disposed in the second portion in communication with the first portion of the first end of the ferrule retainer.

32. The method of claim 29, further comprising referencing the at least one alignment feature through the at least one access window.

33. The method of claim 29, further comprising polishing the at least one optical fiber.

34. The method of claim 29, further comprising removing the end surface of the at least one reference feature from the at least one access window of the ferrule retainer.

35. The method of claim 29, wherein abutting the end surface of the at least one reference feature comprises abutting a first end surface of the at least one reference feature to a first alignment surface of the ferrule and a second end surface of the at least one reference feature to a second alignment surface of the ferrule.

36. The method of claim 29, wherein the at least one reference feature is comprised of at least one boss.

* * * * *